US009544556B2

(12) United States Patent
Hiroi et al.

(10) Patent No.: US 9,544,556 B2
(45) Date of Patent: Jan. 10, 2017

(54) PROJECTION CONTROL APPARATUS AND PROJECTION CONTROL METHOD

(71) Applicant: NEC Solution Innovators, Ltd., Tokyo (JP)

(72) Inventors: Noriyoshi Hiroi, Tokyo (JP); Nobuaki Takanashi, Tokyo (JP); Yoshiaki Sato, Tokyo (JP); Hiroyuki Watanabe, Tokyo (JP); Takafumi Kurokawa, Tokyo (JP); Kenji Akiyoshi, Tokyo (JP); Ryohtaroh Tanimura, Tokyo (JP)

(73) Assignee: NEC Solution Innovators, Ltd., Tokyo (JP)

( * ) Notice: Subject to any disclaimer, the term of this patent is extended or adjusted under 35 U.S.C. 154(b) by 0 days.

(21) Appl. No.: 14/690,799

(22) Filed: Apr. 20, 2015

(65) Prior Publication Data

US 2015/0304615 A1    Oct. 22, 2015

(30) Foreign Application Priority Data

Apr. 18, 2014   (JP) ................................. 2014-086512

(51) Int. Cl.
| | |
|---|---|
| *G03B 21/10* | (2006.01) |
| *H04N 9/31* | (2006.01) |
| *G06F 3/042* | (2006.01) |
| *G06F 3/0488* | (2013.01) |
| *G06F 3/03* | (2006.01) |

(52) U.S. Cl.
CPC ............ *H04N 9/3179* (2013.01); *G03B 21/10* (2013.01); *G06F 3/0304* (2013.01); *G06F 3/0425* (2013.01); *G06F 3/0488* (2013.01); *G06F 2203/04101* (2013.01); *G06F 2203/04104* (2013.01)

(58) Field of Classification Search
CPC ......... G03B 21/10; G03B 21/14; G03B 21/62; G06F 3/017; G06F 3/0488; G06F 3/04883; G06F 3/04886
See application file for complete search history.

(56) References Cited

U.S. PATENT DOCUMENTS

| | | | |
|---|---|---|---|
| 2006/0244742 A1* | 11/2006 | Nakamura | ............. G03B 21/14 345/204 |
| 2009/0100767 A1* | 4/2009 | Kondo | .................... G03B 21/10 52/6 |
| 2011/0154233 A1* | 6/2011 | Lamarca | ............... G06F 3/0425 715/764 |
| 2013/0162607 A1* | 6/2013 | Ichieda | ................. G06F 3/0425 345/204 |
| 2013/0227472 A1* | 8/2013 | Sosinski | .............. G06F 3/0481 715/794 |

FOREIGN PATENT DOCUMENTS

WO    WO-2012/035768 A1    3/2012

* cited by examiner

*Primary Examiner* — Sultan Chowdhury
(74) *Attorney, Agent, or Firm* — Wilmer Cutler Pickering Hale and Dorr LLP

(57) ABSTRACT

A projection control apparatus, method and non-transitory computer-readable storage medium are disclosed. A projection control apparatus may include a memory storing instructions; and one or more processors configured to process the instructions to: cause a projection apparatus to project an image; detect a user operation; control the projection apparatus to change projection parameters upon detecting a first user operation; and control the one or more processors to change the image without changing the projection parameters upon detecting a second user operation.

17 Claims, 17 Drawing Sheets

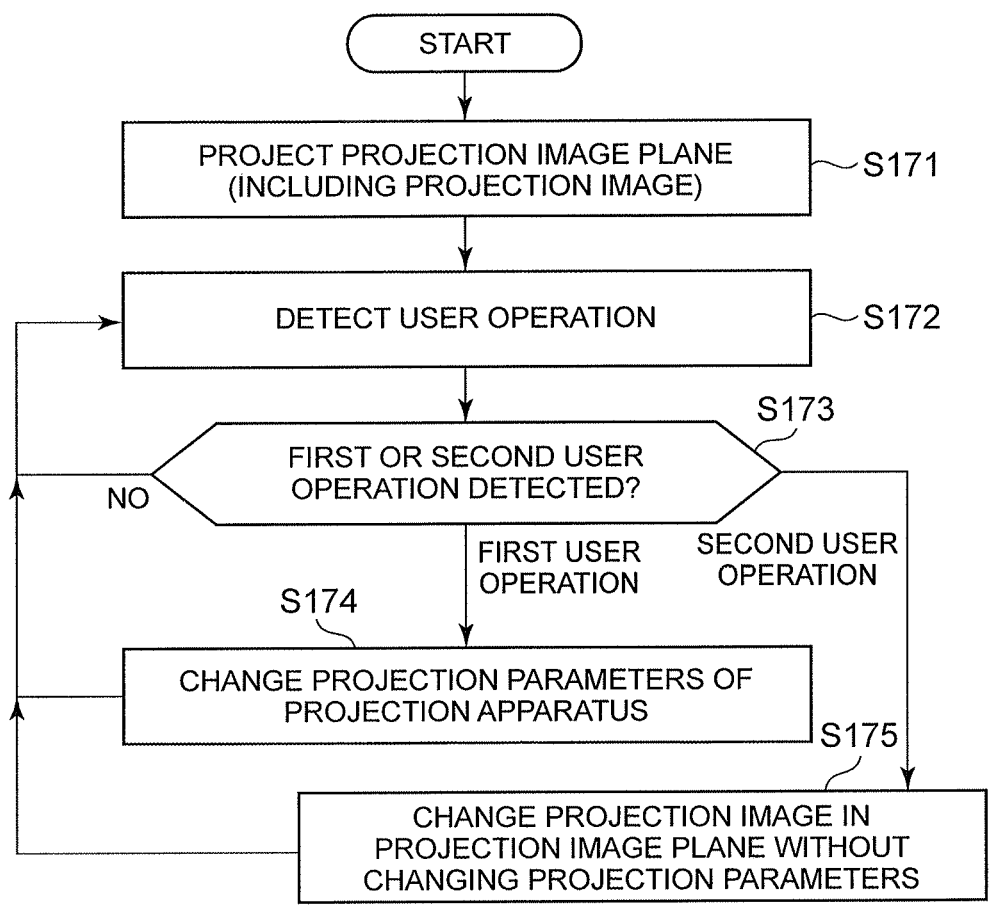

PROJECTION CONTROL APPARATUS AND PROJECTION CONTROL METHOD

CROSS-REFERENCE TO RELATED PATENT APPLICATION

This application is based upon and claims the benefit of priority from Japanese Patent Application No. 2014-086512, filed on Apr. 18, 2014, the disclosure of which is incorporated herein in its entirely by reference.

BACKGROUND

Technical Field

The present disclosure generally relates to a technique for controlling a projection image.

Description of the Related Art

Digital signages for presenting an advertisement, guidance information, and the like may have been widespread as a new information medium. Some digital signages may project a video on a wall or the like without using a display panel. In some instances, there may be an information display method using a projector, for presenting different images between a person viewing an image through glasses and a person viewing an image with the naked eyes. Further, in the method, a main image with a compressed gradation value may be projected on a screen through a first polarization filter, and a correction image corresponding to a difference between gradation values of a sub image with a changed gradation value and gradation values of the main image may be projected on the screen through a second polarization filter with polarization components different from those of the first polarization filter.

According to the method, each viewer may adopt a viewing method according to preferable one of the images (whether to use glasses) to view the preferable one of the images. However, when the screen on which the images are projected is fixed as in the method, each viewer may need to move to a position where the screen can be visually recognized and may need to face the direction of the screen.

SUMMARY OF THE DISCLOSURE

Exemplary embodiments of the present disclosure may solve one or more of the above-noted problems. For example, the exemplary embodiments may provide a projection control technique for highly conveniently providing a projection image.

According to a first aspect of the present disclosure, a projection control apparatus is disclosed. The projection control apparatus may include a memory storing instructions; and one or more processors configured to cause a projection apparatus, which change projection parameters for setting a projection method of an image, to project the image, detect a user operation, control the projection apparatus to change the projection parameters to project the image upon detecting a first user operation, and control the one or more processors to change the image without changing the projection parameters upon detecting a second user operation.

An information processing method according to another aspect of the present disclosure may include projecting an image, detecting a user operation, changing projection parameters for setting a projection method of the image to project the image upon detecting a first user operation, and changing the image without changing the projection parameters upon detecting a second user operation.

A non-transitory computer-readable storage medium may store instructions that when executed by a computer enable the computer to implement a method. The method may include projecting an image, detecting a user operation, changing projection parameters for setting a projection method of the image to project the image upon detecting a first user operation, and changing the image without changing the projection parameters upon detecting a second user operation.

In certain embodiments, the projection control apparatus, the control method, and the computer-readable medium may provide a technique for highly conveniently providing a projection image.

BRIEF DESCRIPTION OF THE DRAWINGS

FIG. 17 is a flowchart depicting an example of operation of the projection control apparatus of the sixth exemplary embodiment.

DETAILED DESCRIPTION

Hereinafter, embodiments of the present disclosure will be described with reference to the accompanying drawings.

Wherever possible, the same reference numbers will be used throughout the drawings to refer to the same or like parts.

First Exemplary Embodiment

Hereinafter, a projection control apparatus and a projection control method according to a first embodiment will be described with reference to drawings.

[Hardware Configuration]

Figure 1:
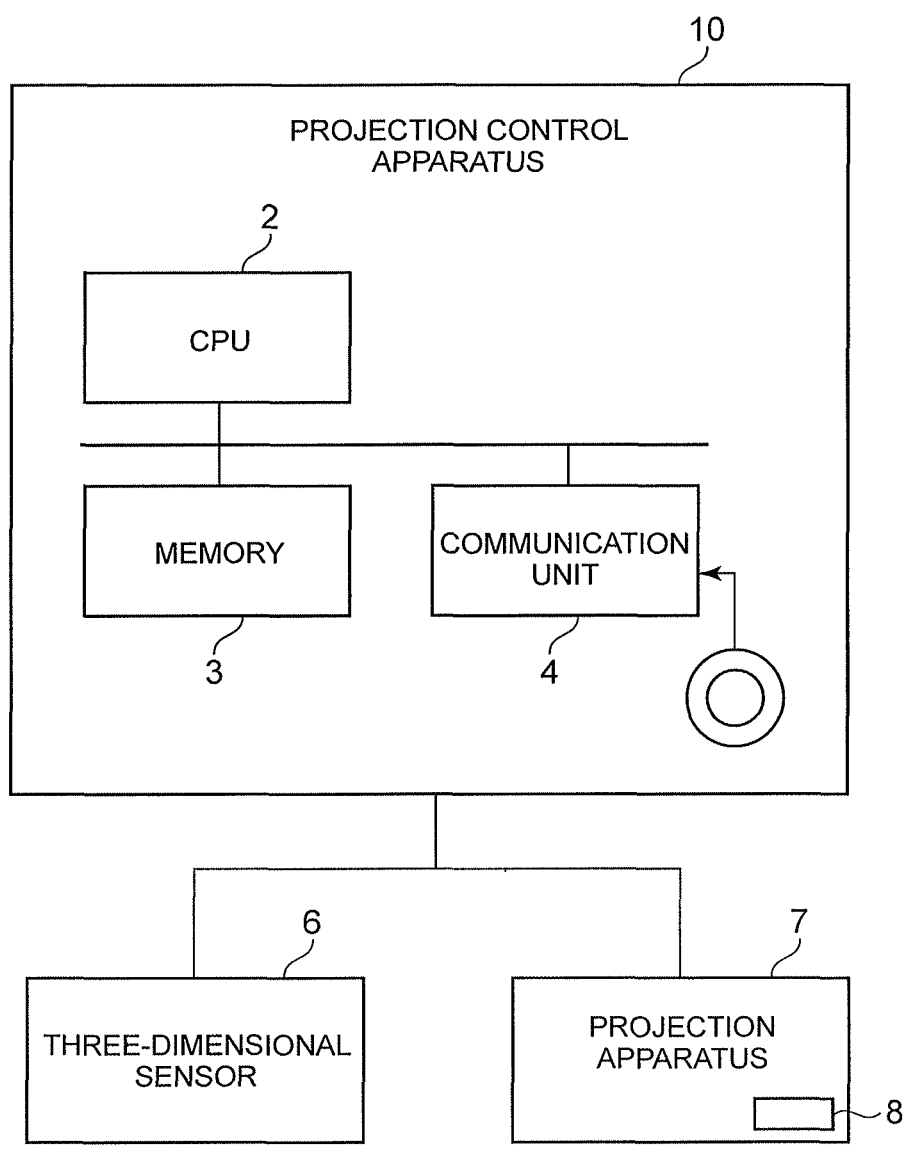
FIG. 1 is a diagram illustrating an example of a hardware configuration of a projection control apparatus of a first exemplary embodiment.

FIG. 1 is a diagram illustrating an example of a hardware configuration of a projection control apparatus 10 of the first embodiment. The projection control apparatus 10 may be a projection-type digital signage apparatus including a CPU (Central Processing Unit) 2, a memory 3, a communication unit 4, and the like. The memory 3 may be a RAM (Random Access Memory), a ROM (Read Only Memory), a hard disk, or the like. The communication unit 4 may perform communication with other computers through a communication network, exchange of signals with other devices such as a three-dimensional sensor 6 and a projection apparatus 7, and so forth. A portable recording medium and the like may also be connected to the communication unit 4. In some aspects, the form of communication between the projection control apparatus 10 and the three-dimensional sensor 6 as well as the projection apparatus 7 may not be limited. The projection control apparatus 10 may also include other hardware elements, and the hardware configuration of the projection control apparatus 10 may not be limited.

The three-dimensional sensor 6 may obtain sensor information including information of two-dimensional pictures (images) and information of distance from the three-dimensional sensor 6 (depth information). In some instances, the three-dimensional sensor 6 may include a visible light camera and a distance image sensor. The distance image sensor may be also called a depth sensor. The distance image sensor may emit a pattern of near-infrared light from a laser and may calculate the distance (depth) from the distance image sensor to the detection target based on information obtained by imaging the pattern by the camera that detects the near-infrared light. In some aspects, the method of realizing the three-dimensional sensor 6 may not be limited. The three-dimensional sensor 6 may include a three-dimensional scanner system using a plurality of cameras.

Figure 2:
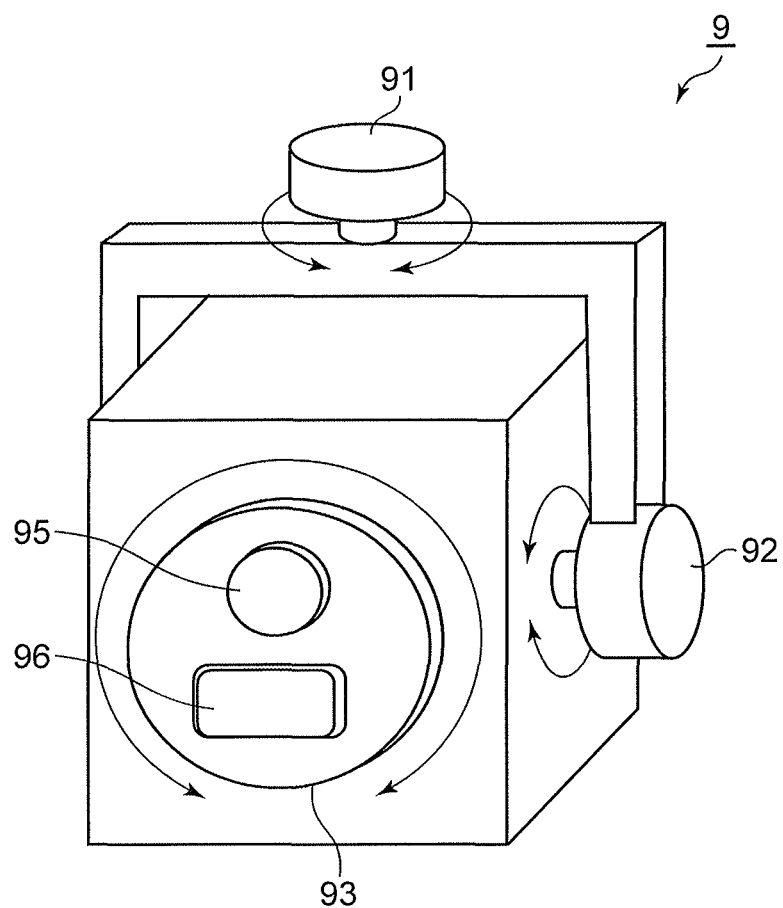
FIG. 2 is a diagram illustrating an example of an external form of an IP (Interactive Projection) apparatus.

The projection apparatus 7 may project light on a projection surface based on image information transmitted from the projection control apparatus 10 to project an image on the projection surface. The projection apparatus 7 may include a unit that adjusts the projection direction (e.g., direction adjustment unit 8). The direction adjustment unit 8 may include any one of, a plurality of, or all of a mechanism for changing the direction of a projection section that projects light, a mechanism for changing the direction of the light projected from the projection section, and other mechanisms. In some aspects, the three-dimensional sensor 6 and the projection apparatus 7 may be realized by separate devices as illustrated in FIG. 1. In other aspects, the three-dimensional sensor 6 and the projection apparatus 7 may be realized by one device as illustrated in FIG. 2. In some aspects, the integrated structure of the three-dimensional sensor 6 and the projection apparatus 7 may not be limited to the structure of FIG. 2.

FIG. 2 is a diagram illustrating an example of an IP (Interactive Projection) apparatus. As illustrated in FIG. 2, an IP apparatus 9 may include direction adjustment mechanisms 91, 92, and 93, a projection section 95, a sensing section 96, and the like. The projection section 95 may project light and may correspond to part of the projection apparatus 7. The sensing section 96 may detect sensor information and may correspond to part of the three-dimensional sensor 6. As illustrated in FIG. 2, the projection section 95 and the sensing section 96 may be installed so that the direction of the sensing axis and the direction of the projection axis are parallel.

The direction adjustment mechanisms 91, 92, and 93 may be an example of a method of realizing the direction adjustment unit 8, and the structure may allow adjusting the directions of the projection axis and the sensing axis. The direction adjustment mechanism 91 may change the directions in the horizontal direction in the drawing, the direction adjustment mechanism 92 may change the directions in the vertical direction in the drawing, and the direction adjustment mechanism 93 may rotate the directions in the drawing. In some aspects, the IP apparatus 9 may include a movable mirror or optical mechanism as the direction adjustment unit 8 without moving the housing provided with the projection section 95 and the sensing section 96.

Figure 3:
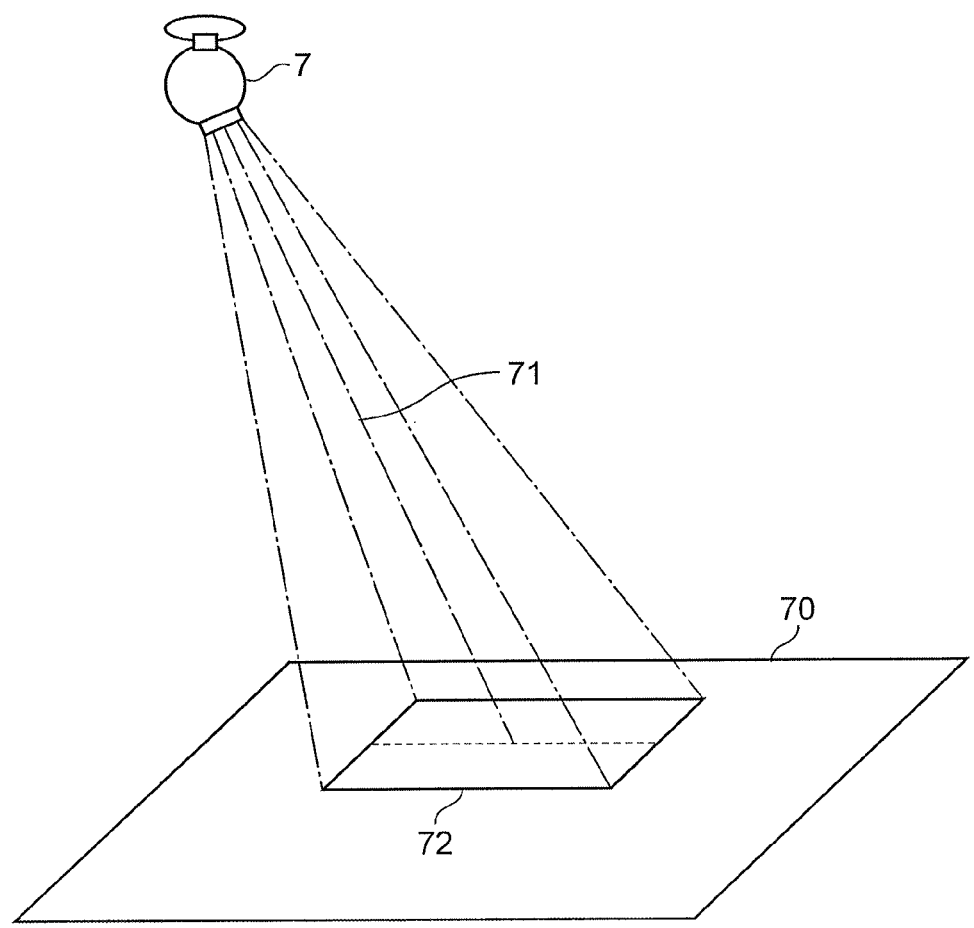
FIG. 3 is a diagram illustrating a projection image plane projected by a projection apparatus.

FIG. 3 is a diagram illustrating a projection image plane projected by the projection apparatus 7. As illustrated in FIG. 3, the projection apparatus 7 may project a projection image plane 72 on a projection surface 70. The projection image plane 72 may include the entire projection area on the projection surface 70. The projection axis is indicated by reference sign 71 of FIG. 3. A direction adjustment unit of the projection apparatus 7 may change the projection direction (direction of the projection axis 71) to move the projection image plane 72 on the projection surface 70.

Figure 4:
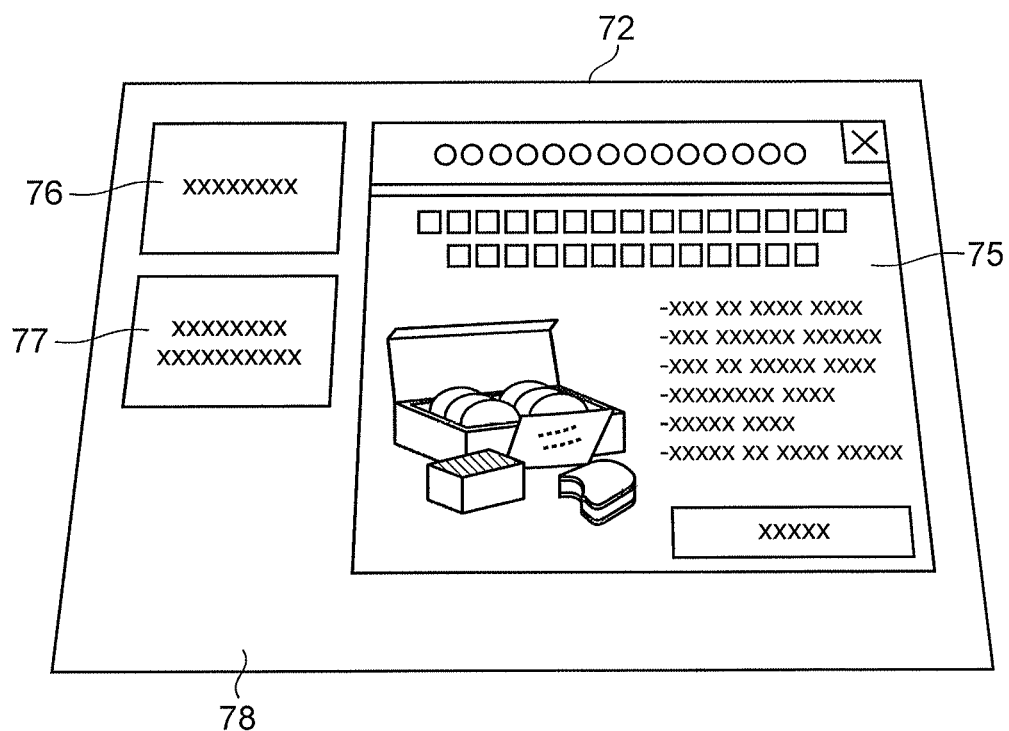
FIG. 4 is a diagram illustrating an example of a projection image plane.

FIG. 4 is a diagram illustrating an example of the projection image plane. The projection apparatus 7 may display projection images in the projection image plane 72 based on image information transmitted from the projection control apparatus 10. In the example of FIG. 4, projection images 75, 76, and 77 may be displayed in the projection image plane 72, and the projection image plane 72 may include an area 78 other than the display areas of the projection images 75, 76, and 77. This area will be described below as a projection background area 78. The projection apparatus 7 may set the projection background area 78 in the projection image plane 72 based on image information transmitted from the projection control apparatus 10.

In some aspects, the projection image plane may include the entire area of the projection pictures displayed on the projection surface by the light projected from the projection apparatus 7, and the images or the projection images may include images displayed in the projection image plane. In other aspects, in-screen operation may include user operation in the projection image plane.

[Processing Configuration]

Figure 5:
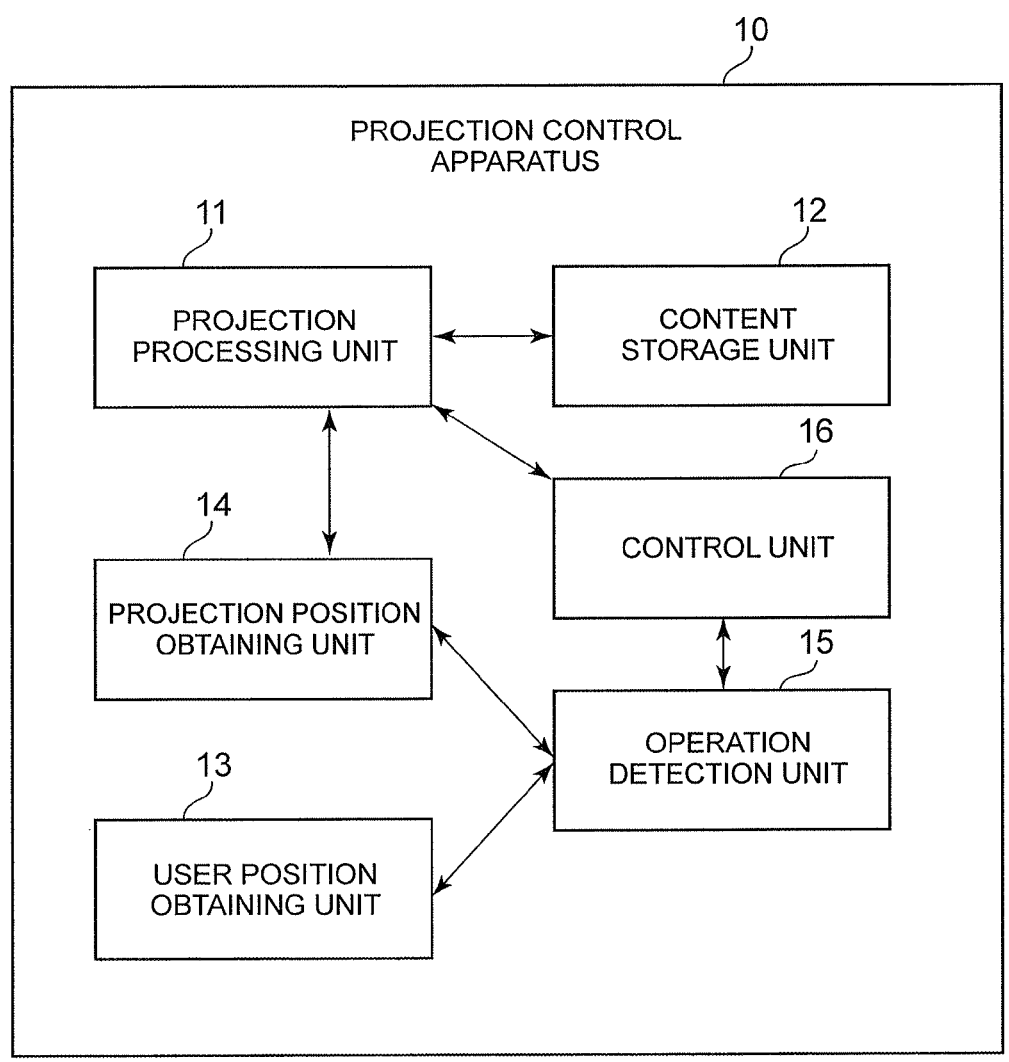
FIG. 5 is a diagram illustrating an example of a processing configuration of the projection control apparatus of the first exemplary embodiment.

FIG. 5 is a diagram illustrating an example of a processing configuration of the projection control apparatus 10 of the first embodiment. The projection control apparatus 10 may include a projection processing unit 11, a content storage unit 12, a user position obtaining unit 13, a projection position obtaining unit 14, an operation detection unit 15, a control unit 16, and the like. In some aspects, these processing units may include the CPU 2 executing programs stored in the memory 3. In some aspects, the programs may be installed from a portable recording medium, such as a CD (Compact Disc) and a memory card, or from another computer on the network through the communication unit 4 and stored in the memory 3.

The projection processing unit 11 may cause the projection apparatus 7 to project images. In some aspects, the projection processing unit 11 may transmit image information stored in the content storage unit 12 to the projection apparatus 7 to cause the projection apparatus 7 to project projection images corresponding to the image information. The content of the images and the image information may not be limited. In some aspects, the projection image plane 72 may be projected on the projection surface as illustrated in FIG. 4, and the projection images may be displayed (projected) in the projection image plane 72.

The projection processing unit 11 may change the projection contents (projection images) in the projection image plane based on an instruction of the control unit 16 described below. In some aspects, the projection processing unit 11 may transmit the image information indicating the projection images changed in accordance with the instruction of the control unit 16, to the projection apparatus 7. The change in the projection images may include various examples, such as movement, enlargement, reduction, rotation, and transition of display content.

The content storage unit 12 may store a plurality of pieces of image information for generating images to be projected on the projection apparatus 7. Each piece of image information may indicate an image of a text, a design, a video, or the like displayed at a predetermined position in the projection image plane. In some aspects, the image information stored in the content storage unit 12 may include display data generated by the CPU 2 executing an application program. The stored image information may not be limited.

The user position obtaining unit 13 may recognize a specific region of the user based on sensor information obtained from the three-dimensional sensor 6 and may obtain region position information indicating the position of the recognized specific region. In some aspects, the user position obtaining unit 13 may use at least one of the image information and the depth information included in the sensor information to recognize the specific region of the user. The recognized specific region may include part of the body (such as a fingertip) or an operation tool used by the user to perform the operation. A well-known object recognition method may be used as a method of recognizing the specific region from the image. In an example of the recognition method, the user position obtaining unit 13 may use a feature of the image from the image information to recognize the head of a person and may use the image information and the distance information to recognize the specific region from the positional relationship with respect to the head of the person and from the feature of the image.

The user position obtaining unit 13 may obtain the position information of the specific region of the user recognized as described above based on two-dimensional image information and distance information included in the sensor information. In some aspects, the user position obtaining unit 13 may obtain the position information of the specific region in a three-dimensional coordinate space that is set based on the position and the direction of the three-dimensional sensor 6.

The projection position obtaining unit 14 may obtain projection position information indicating the position where at least part of the projection image plane is projected, based on the sensor information obtained from the three-dimensional sensor 6. In some aspects, the projection position obtaining unit 14 may recognize the distance (projection distance) from the projection apparatus 7 to the projection surface based on the position and the projection direction of the projection apparatus 7 and based on the sensor information. Further, the projection position obtaining unit 14 may specify the position where the projection image plane is projected in the three-dimensional coordinate space, based on the distance and the projection specifications of the projection apparatus 7. The position where the projection image plane is projected may be indicated by a position on a plane corresponding to the projection image plane on the three-dimensional coordinate space.

The projection image may be displayed in the projection image plane as illustrated in FIG. 4. In some aspects, the projection position obtaining unit 14 may specify the position where the projection image which is included in at least part of the projection image plane is projected, as described below. The projection position obtaining unit 14 may obtain the information of the position of the projection image in the three-dimensional coordinate space based on the position of the specified projection image plane and the position of the projection image in the projection image plane obtained from the image information processed by the projection processing unit 11.

The operation detection unit 15 may detect user operation. In some aspects, the operation detection unit 15 may detect user operation using the specific region for at least part of the projection image plane or outside of the projection image plane based on the region position information obtained by the user position obtaining unit 13 and the projection position information obtained by the projection position obtaining unit 14. In some instances, the operation detection unit 15 may detect operation of touching an arbitrary part inside or outside of the projection image plane using the specific region and immediately moving the specific region away from the projection surface (hereinafter, described as tap operation). The operation detection unit 15 may detect operation of touching an arbitrary part inside or outside of the projection image plane using the specific region for longer than a predetermined time, moving the specific region on the projection surface in this state, and than moving the specific region away from the projection surface (hereinafter, described as drag operation). The operation detection unit 15 may detect flick operation, swipe operation, and the like. In some aspects, the swipe operation may include operation of touching an arbitrary part and moving the specific region on the projection image plane before the above-mentioned predetermined time is elapsed, and the swipe operation is distinguishable from the drag operation according to time for touching an arbitrary part inside or outside of the projection image plane. In some aspects, the user operation detected by the operation detection unit 15 may not be limited.

The operation detection unit 15 may specify the position of the detected user operation. One or a plurality of positions may be specified in accordance with the detected user operation. In some aspects, in the tap operation, the position where the specific region has touched inside or outside of the projection image plane may be specified as the position of the user operation. In some aspects, in the drag operation, a plurality of positions on the movement locus from the position where the specific region has initially touched inside or outside of the projection image plane to the position where the specific region moves away from the projection surface may be specified as the positions of the user operation. The specified positions of the user operation may be mapped in a common three-dimensional coordinate space.

The operation detection unit 15 may distinctively detect at least two types of user operations based on the positions of the specified user operation. The two types of user operations will be described as a first user operation and a second user operation. In some aspects, the operation detection unit 15 may use the image information processed by the projection processing unit 11 to determine the location of one or both of the position of the start of the detected user operation and the position of the end of the detected user operation, and may detect the user operation as the first or second user operation in accordance with the result. The first user operation may be an operation allocated to move the projection image plane, and the second user operation may be an operation allocated to change the projection image in the projection image plane.

[Example of Detection of User Operation]

Hereinafter, an example of detection of the first and second user operations in the first exemplary embodiment will be illustrated. In some aspects, the process of the operation detection unit 15 may not be limited to the following example.

The operation detection unit 15 may detect the operation as the first user operation if the position of the start of the detected user operation is included in a region which is not allocated to the in-screen operation in the projection image plane and may detect the operation as the second user operation if the position is included in a region which is allocated to the in-screen operation in the projection image plane. In some aspects, an area for displaying information or images in the projection image plane may be a region which is not allocated to the in-screen operation. In other aspects, a region where certain input operation, such as selection operation, is expected in the projection image plane may be a region which is allocated to the in-screen operation.

The operation detection unit 15 may detect the operation as the first user operation if the position of the start of the detected user operation is inside of the projection image plane and the end position of the user operation is outside of the projection image plane. The operation detection unit 15 may detect the operation as the second user operation if the start position and the end position are both inside of the projection image plane.

In other aspects, the operation detection unit 15 may detect the operation as the first user operation if the position of the start of the detected user operation is the projection background area in the projection image plane. The operation detection unit 15 may detect the operation as the second user operation if the position is on the projection image in the projection image plane. The projection background area is indicated by reference sign 78 in FIG. 4.

In other aspects, the operation detection unit 15 may detect the operation as the first user operation if the position of the start of the detected user operation is outside of the projection image plane. The operation detection unit 15 may detect the operation as the second user operation if the position is inside of the projection image plane. The operation detection unit 15 may detect contact operation outside of the projection image plane based on whether the specific region of the user exists on a plane enlarging the plane corresponding to the projection image plane in the three-dimensional coordinate space without changing the position.

The operation detection unit 15 may detect the operation as the first user operation if the position of the start of the detected user operation is on a dedicated operation image (such as an icon) in the projection image plane and detect the operation as the second user operation if the position is outside of the dedicated operation image. In some aspects, the image information processed by the projection processing unit 11 may include the dedicated operation image.

The control unit 16 may change the projection direction of the projection apparatus 7 to move the projection image plane displayed on the projection surface if the first user operation is detected by the operation detection unit 15. The control unit 16 may change the projection contents (projection images) in the projection image plane without changing the projection direction if the second user operation is detected. In some instances, the control unit 16 may change the projection direction of the projection apparatus 7 as described below if the first user operation is detected.

The control unit 16 may determine movement parameters (direction, speed, distance, and the like) of the projection image plane according to the detected user operation. The movement parameters of the projection image plane may be determined by the movement direction, the movement speed, the movement distance, and the like of the specific region indicated by the detected user operation. The control unit 16 may convert the calculated movement parameters into change parameters of the projection direction of the projection apparatus 7. A well-known geometrical method may be used for the conversion method. In some aspects, the conversion method may be realized by inverse calculation of calculation of the projection position by the projection position obtaining unit 14. In some aspects, the change parameters may include the direction to be changed, the change speed, and the like. The control unit 16 may transmit a change instruction of the projection direction including the change parameters of the projection direction to the projection apparatus 7. In some aspects, the projection apparatus 7 may cause the direction adjustment unit 8 to change the projection direction in accordance with the obtained change parameters to project the projection image plane in the instructed projection direction to eventually move the projection image plane projected on the projection surface.

In other aspects, the control unit 16 may change the projection image in the projection image plane as described below if the second user operation is detected. In some instances, the control unit 16 may determine what kind of in-screen operation the detected user operation is. The in-screen operation may include various operations possible in a computer, by using a user interface device, such as a keyboard and a mouse, to the content displayed in a display unit, such as a display. In some instances, there may be various in-screen operations, such as movement of an image, enlargement of an image, reduction and rotation, selection of a hyperlink, a selection button, or a menu, display scroll, display transition, and the like, and the operations may not be limited. The control unit 16 may instruct the projection processing unit 11 to form a projection image in accordance with the in-screen operation corresponding to the detected user operation. In some instances, the projection processing unit 11 may transmit, to the projection apparatus 7, the image information in which the display state is changed according to the in-screen operation, and as a result, the projection image in the projection image plane may be changed without moving the projection image plane.

[Example of Operation/Projection Control Method]

Hereinafter, a projection control method according to the first exemplary embodiment will be described with reference to FIG. 6.

Figure 6:
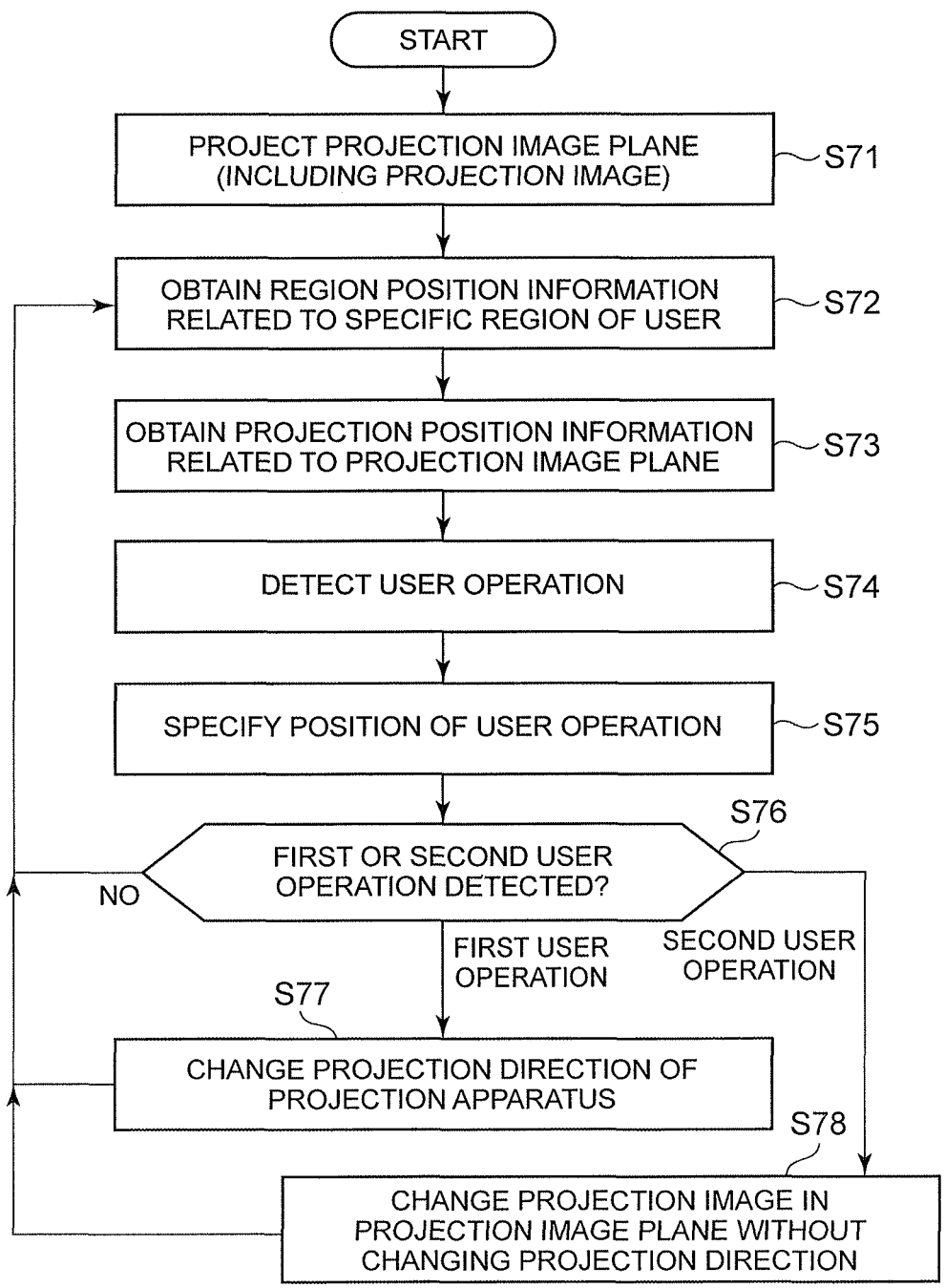
FIG. 6 is a flowchart depicting an example of operation of the projection control apparatus of the first exemplary embodiment.

FIG. 6 is a flowchart depicting an example of operation of the projection control apparatus 10 of the first exemplary embodiment. As depicted in FIG. 6, at least one computer, such as the projection control apparatus 10, may execute the projection control method of the first exemplary embodiment. In some instances, the processing units included in the projection control apparatus 10 may execute the depicted steps. The steps may be the same as in the processing content of the processing units included in the projection control apparatus 10.

In the Step S71, the projection control apparatus 10 may cause the projection apparatus 7 to project the image. In some aspects, the projection control apparatus 10 may transmit the image information to the projection apparatus 7 to project the projection image corresponding to the image information on the projection surface 70. As a result, the projection image plane may be projected on the projection surface, and the projection image may be displayed in the projection image plane.

In the Step S72, the projection control apparatus 10 may recognize the specific region of the user based on the sensor information obtained from the three-dimensional sensor 6 and obtain the region position information indicating the position of the recognized specific region. The position of the specific region may be mapped in the three-dimensional coordinate space shared in the projection control apparatus 10.

In the Step S73, the projection control apparatus 10 may obtain the projection position information indicating the position where at least part of the projection image plane is projected, based on the sensor information obtained from the three-dimensional sensor 6. The method of obtaining the position where the projection image plane is projected may be as described above. The positions of the projection images in the projection image plane may be specified based on the image information for projecting the projection images in the Step S71. The projection positions may be mapped in the three-dimensional coordinate space shared in the projection control apparatus 10.

In the Step S74, based on the region position information obtained in the Step S72 and the projection position information obtained in the Step S73, the projection control apparatus 10 may detect the user operation using the specific region for at least part of the projection image plane or outside of the projection image plane.

In the Step S75, the projection control apparatus 10 may specify the position of the user operation detected in the Step S74. The specified operation position may be mapped in the three-dimensional coordinate space shared in the projection control apparatus 10.

In the Step S76, the projection control apparatus 10 may determine whether the first or second user operation is detected based on the position of the user operation specified in the Step S75. The detection method of the first and second user operations based on the position of the user operation may be as described above.

In the Step S76, if the projection control apparatus 10 determines that the first user operation is detected (Step S76; first user operation), the projection control apparatus 10 may change the projection direction of the projection apparatus 7 in the Step S77. In some aspects, the projection control apparatus 10 may transmit the change instruction of the projection direction to the projection apparatus 7. In the Step S76, if the projection control apparatus 10 determines that the second user operation is detected (Step S76; second user operation), the projection control apparatus 10 may change the projection image in the projection image plane without changing the projection direction in the Step S78.

After the execution of Step S77 or Step S78 or if the projection control apparatus 10 determines that the first or second user operation is not detected (Step S76; NO), the projection control apparatus 10 may execute the process from Step S72 again.

Figure 7:
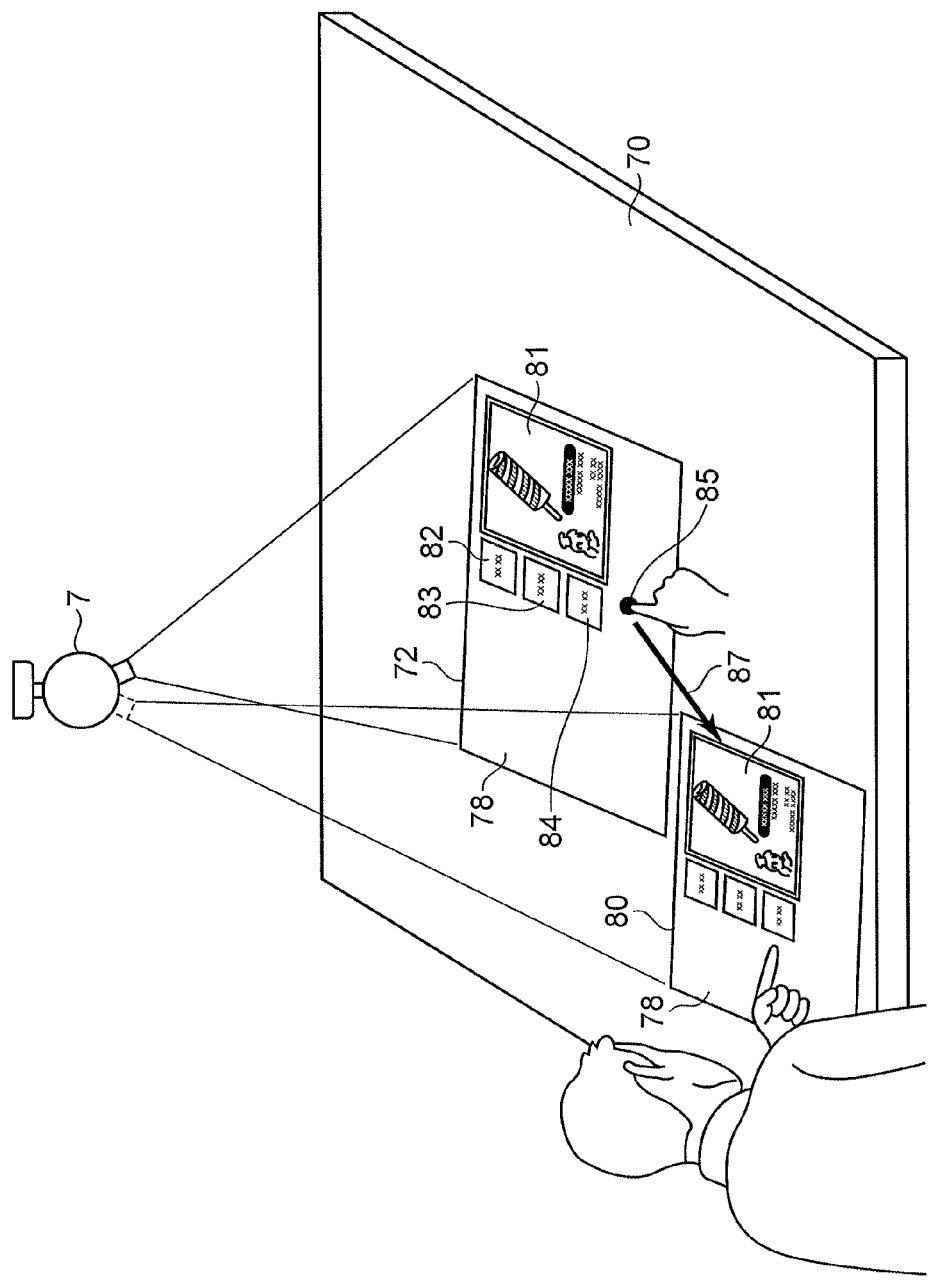
FIG. 7 is a diagram illustrating an example of movement of the projection image plane of the first exemplary embodiment.
Figure 8:
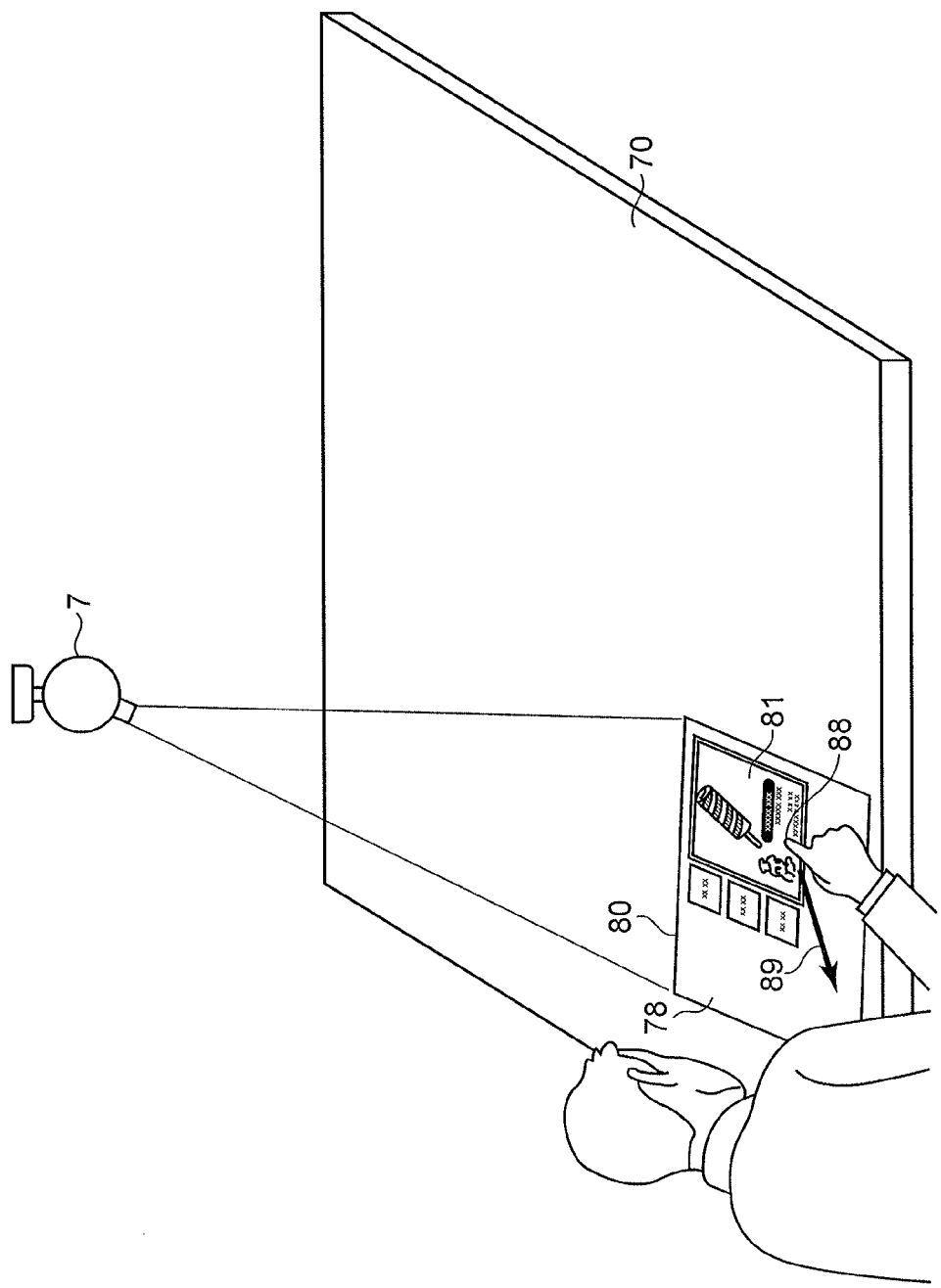
FIG. 8 is a diagram illustrating an example of change in a projection image (projection content) in the projection image plane.

Examples of the projection control method will be described with reference to FIGS. 7 and 8. FIGS. 7 and 8 illustrate examples of implementation scenes of the projection control method. In the examples of FIGS. 7 and 8, the projection surface 70 may be a table used by the user, and the projection apparatus 7 may be installed above the table, facing the direction of the table. In some aspects, the three-dimensional sensor 6 may be installed in the same direction near the projection apparatus 7.

FIG. 7 is a diagram illustrating an example of movement of the projection image plane according to the first exemplary embodiment.

In the Step S71, the projection control apparatus 10 may project projection images 81, 82, 83, and 84 at the center of the projection surface 70. As a result, the projection images 81, 82, 83, and 84 may be displayed in the projection image plane 72.

In the Step S72, the projection control apparatus 10 may obtain the region position information indicating the position of a fingertip of the user using the table that serves as the projection surface 70. In the Step S73, the projection control apparatus 10 may obtain the projection position information indicating the position where the projection image plane 72 is projected and the positions of the projection images 81, 82, 83, and 84 in the projection image plane 72.

In the Step S74, the projection control apparatus 10 may detect operation in which the fingertip of the user touches a position 85 in the projection image plane 72 and in which the fingertip moves in a direction 87 on the projection surface 70.

In the Step S75, the projection control apparatus 10 may specify the position 85 that is the start point of the detected user operation, the position after the movement (including the movement direction 87), and the like.

If the position 85 of the start of the user operation detected in the Step S74 is in the projection background area 78 in the projection image plane 72, the projection control apparatus 10 may determine that the user operation is the first user operation (Step S76; first user operation). In the Step S77, the projection control apparatus 10 may change the projection direction of the projection apparatus 7 to move the projection image plane 72 to the position indicated by reference sign 80.

FIG. 8 is a diagram illustrating an example of change in the projection image (projection content) in the projection image plane. FIG. 8 illustrates the projection image plane 80 after the projection image plane 72 illustrated in FIG. 7 is moved as described above. The projection image plane 80 is projected in an area near the user, on the table that serves as the projection surface 70.

In the Step S72, the projection control apparatus 10 may obtain the region position information indicating the position of the fingertip of the user. In the Step S73, the projection control apparatus 10 may obtain the projection position information indicating the position where the projection image plane 80 is projected and the positions of the projection image 81 and the like in the projection image plane 80.

In the Step S74, the projection control apparatus 10 may detect operation in which the fingertip of the user touches a position 88 in the projection image plane 80 and in which the fingertip moves in a direction 89 on the projection surface 70. In the Step S75, the projection control apparatus 10 may specify the position 88 that is the start point of the detected user operation, the position after the movement (including the movement direction 89), and the like.

If the position 88 of the start of the user operation detected in the Step S74 is on the projection image 81 in the projection image plane 80, the projection control apparatus 10 determines that the user operation is the second user operation (Step S76; second user operation). In the Step S78, the projection control apparatus 10 may move the projection image 88 in the direction 89 in the projection image plane 80 without changing the projection direction to thereby change the projection image (projection content) of the projection image plane 80. In a certain aspect, the projection control apparatus 10 may transmit, to the projection apparatus 7, image information indicating the movement of the projection image 88 in the projection image plane 80 to thereby move the projection image 88 in the projection image plane 80.

As described, in the first exemplary embodiment, the region position information indicating the position of the specific region of the user and the projection position information indicating the position where at least part of the projection image plane is projected may be obtained, and the user operation using the specific region for at least part of the projection image plane or outside of the projection image plane may be detected based on the position information. Whether the user operation is the first or second user operation may be determined based on the position of the detected user operation. The projection direction of the projection apparatus 7 or the projection image in the projection image plane may be changed according to the determination result. In some instances, the projection direction of the projection apparatus 7 may be changed if the first user operation is detected, and as a result, the projection image plane displayed on the projection surface may be moved. If the second user operation is detected, the projection image in the projection image plane may be changed without changing the projection direction.

Therefore, according to the first exemplary embodiment, the user can perform the first user operation to move the projection image plane, and, the projection image plane can be shared by a plurality of users as in the implementation scenes illustrated in FIGS. 7 and 8. This is because each user can move the projection image plane to an easily accessible position. To realize the sharing of the projection image plane by a format of using a display unit such as a display, each user needs to move the display unit, and this is inconvenient. The first exemplary embodiment can provide an environment in which a plurality of persons can share the projection image plane by simple operation without using user terminals. Therefore, the projection image can be highly conveniently provided.

The movement of the projection image plane and the change in the projection image in the projection image plane may be switched in accordance with the position of the user operation for at least part of the projection image plane or outside of the projection image plane, and the projection image can be provided in a user-friendly state.

Second Exemplary Embodiment

Hereinafter, a projection control apparatus and a projection control method of a second exemplary embodiment will be described with reference to the drawings. In the second exemplary embodiment, the movement of the projection image plane and the change in the projection image in the projection image plane may be switched based on the time of the user operation. Hereinafter, content of the second exemplary embodiment different from the first embodiment will be mainly described.

[Processing Configuration]

In an embodiment, the projection control apparatus 10 may include a projection processing unit 11, a content storage unit 12, a user position obtaining unit 13, a projection position obtaining unit 14, an operation detection unit 15, a control unit 16, and the like. In a certain aspects, the projection processing unit 11, the content storage unit 12, the user position obtaining unit 13, the projection position obtaining unit 14, and the control unit 16 are similar in functionality to corresponding elements of the projection control apparatus 10 described above in reference to FIG. 5.

For example, and as described above, the projection processing unit 11 may cause a projection apparatus 7 (e.g., the projection apparatus 7 described above in reference to FIG. 1) to project images.

The content storage unit 12 may store a plurality of pieces of image information for generating images to be projected on the projection apparatus 7.

The user position obtaining unit 13 may recognize a specific region of the user based on sensor information obtained from a three-dimensional sensor 6 (e.g., the three-dimensional sensor 6 described above in reference to FIG. 1) and may obtain region position information indicating the position of the recognized specific region.

The projection position obtaining unit 14 may obtain projection position information indicating the position where at least part of a projection image plane (e.g., the projection image plain described in the first exemplary embodiment) is projected, based on the sensor information obtained from the three-dimensional sensor 6.

The control unit 16 may change the projection direction of the projection apparatus 7 to move the projection image plane displayed on a projection surface (e.g., the projection surface described in the first exemplary embodiment) if the first user operation is detected by an operation detection unit 15 described below. The control unit 16 may change the projection contents (projection images) in the projection image plane without changing the projection direction if the second user operation is detected.

The operation detection unit 15 may measure the time of the user operation (operation time) using the specific region for at least part of the projection image plane or outside of the projection image plane detected as described above and may distinctively detect the first user operation and the second user operation based on the measured operation time. The operation time may include time that the specific region has stayed at a position on at least part of the projection image plane or outside of the projection image plane. In some instances, the time that the specific region has touched inside or outside of the projection image plane may be measured in the tap operation. In some instances, in the drag operation, the time that the specific region has stayed at the position where the specific region has first touched inside or outside of the projection image plane may be measured.

In some aspects, the operation detection unit 15 may detect the user operation as the first user operation if the detected user operation includes operation time longer than a predetermined time and detect the user operation as the second user operation if the detected user operation does not include operation time longer than the predetermined time. The predetermined time may be stored in advance by the operation detection unit 15. In some aspects, the operation detection unit 15 may detect the drag operation as the first user operation and detect the other operations, such as the swipe operation, the tap operation, and the flick operation, as the second user operations. The operation detection unit 15 may detect operation unlike the drag operation described below, as the first user operation. In some instances, the operation unlike the drag operation may include a combination of the operations that the specific region touches a position inside or outside of the projection image plane for longer than a predetermined time, and that the specific region moves away from the projection surface, and that the specific region touches another position on the projection surface within a predetermined time.

[Example of Operation/Projection Control Method]

Hereinafter, the projection control method of the second exemplary embodiment will be described with reference to FIG. 9.

Figure 9:
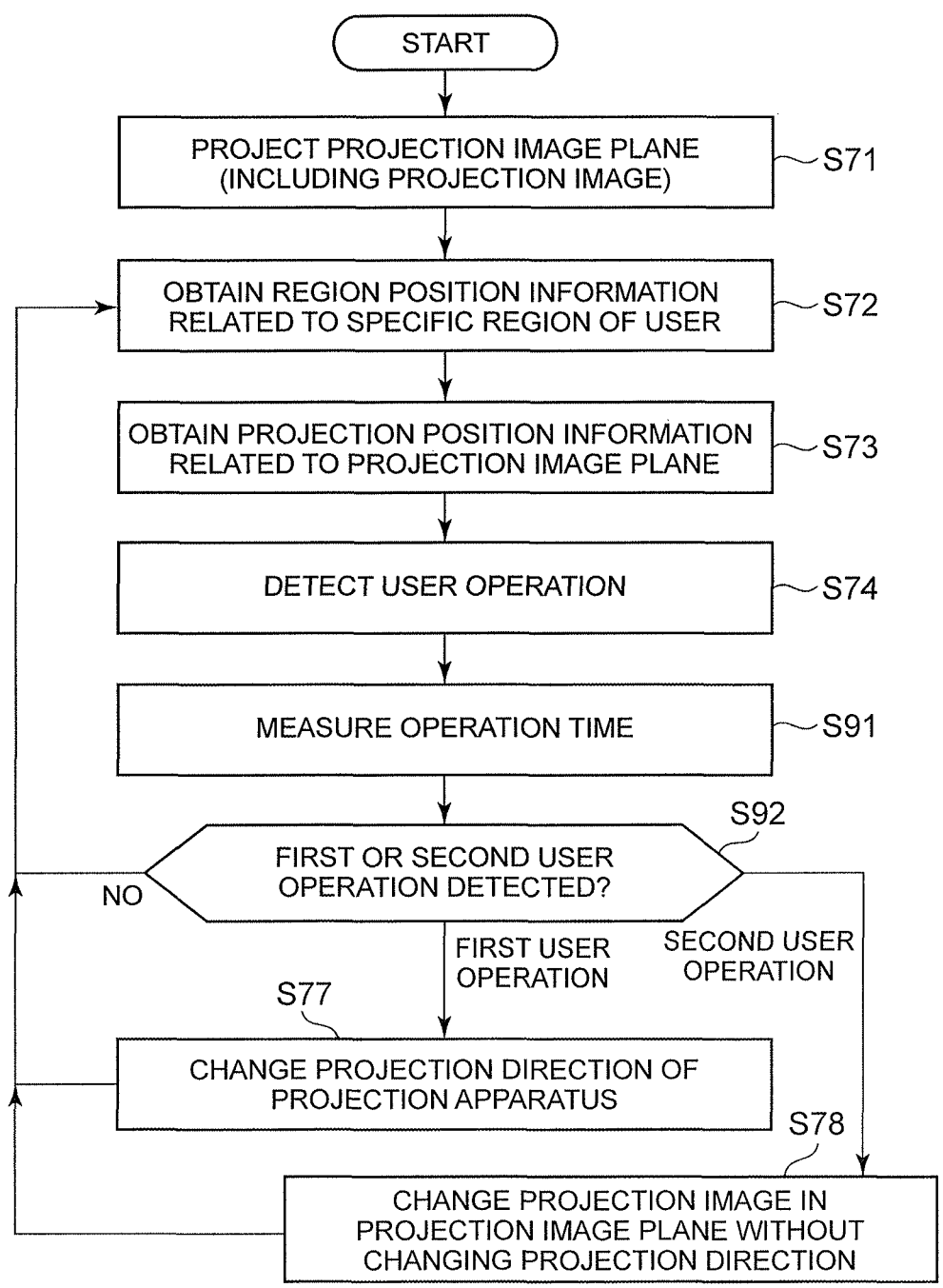
FIG. 9 is a flowchart depicting an example of operation of the projection control apparatus of a second exemplary embodiment.

FIG. 9 is a flowchart depicting an example of operation of the projection control apparatus 10 of the second exemplary embodiment.

By way of example, the projection control apparatus 10 may be configured to perform the exemplary processes of FIG. 6 to cause the projection apparatus 7 to project the image (e.g., Step S71 of FIG. 6), to recognize the specific region of the user based on the sensor information obtained from the three-dimensional sensor 6 and obtain the region position information indicating the position of the recognized specific region (e.g., Step S72 of FIG. 6), to obtain the projection position information indicating the position where at least part of the projection image plane is projected, based on the sensor information obtained from the three-dimensional sensor 6 (e.g., Step S73 of FIG. 6), and to detect the user operation using the specific region for at least part of the projection image plane or outside of the projection image plane (e.g., Step S74 of FIG. 6).

In the Step S91, the projection control apparatus 10 may measure the operation time of the user operation detected in the Step S74.

In the Step S92, the projection control apparatus 10 may determine whether the first or second user operation is detected based on the operation time measured in the Step S91. The detection method of the first and second user operations based on the operation time may be as described above.

In the Step S92, if the projection control apparatus 10 determines that the first user operation is detected (Step S92; first user operation), the projection control apparatus 10 may change the projection direction of the projection apparatus 7 in the Step S77. In some aspects, the projection control apparatus 10 may transmit the change instruction of the projection direction to the projection apparatus 7. In the Step S92, if the projection control apparatus 10 determines that the second user operation is detected (Step S92; second user operation), the projection control apparatus 10 may change the projection image in the projection image plane without changing the projection direction in the Step S78.

After the execution of Step S77 or Step S78 or if the projection control apparatus 10 determines that the first or second user operation is not detected (Step S92; NO), the projection control apparatus 10 may execute the process from Step S72 again.

As described, the time of the user operation using the specific region for at least part of the projection image plane or outside of the projection image plane may be measured in the second exemplary embodiment, and the operation time may be taken into account to determine whether the user operation is the first or second user operation. The projection direction of the projection apparatus 7 or the projection image in the projection image plane may be changed in accordance with the determination result.

According to the second exemplary embodiment, the operations (first user operation and second user operation) for switching the movement of the projection image plane and the change in the projection image in the projection image plane may be set based on the time of the user operation using the specific region for at least part of the projection image plane or outside of the projection image plane. As in the specific example, easily imaginable operation for the user may be realized by setting the drag operation as the operation for moving the projection image plane and setting the other operations as the operations for changing the projection image in the projection image plane.

Third Exemplary Embodiment

Hereinafter, a projection control apparatus and a projection control method according to a third exemplary embodiment will be described with reference to the drawings. In the third exemplary embodiment, the movement of the projection image plane and the change in the projection image in the projection image plane may be switched based on the state of the projection image in the projection image plane subjected to the user operation. Hereinafter, content in the third exemplary embodiment different from the first embodiment will be mainly described.

[Processing Configuration]

In an embodiment, the projection control apparatus 10 may include a projection processing unit 11, a content storage unit 12, a user position obtaining unit 13, a projection position obtaining unit 14, an operation detection unit 15, a control unit 16, and the like. In a certain aspects, the projection processing unit 11, the content storage unit 12, the user position obtaining unit 13, the projection position obtaining unit 14, and the control unit 16 are similar in functionality to corresponding elements of the projection control apparatus 10 described above in reference to FIG. 5.

For example, and as described above, the projection processing unit 11 may cause a projection apparatus 7 (e.g., the projection apparatus 7 described above in reference to FIG. 1) to project images.

The content storage unit 12 may store a plurality of pieces of image information for generating images to be projected on the projection apparatus 7.

The user position obtaining unit 13 may recognize a specific region of the user based on sensor information obtained from a three-dimensional sensor 6 (e.g., the three-dimensional sensor 6 described above in reference to FIG. 1) and may obtain region position information indicating the position of the recognized specific region.

The projection position obtaining unit 14 may obtain projection position information indicating the position where at least part of a projection image plane (e.g., the projection image plain described in the first exemplary embodiment) is projected, based on the sensor information obtained from the three-dimensional sensor 6.

The control unit 16 may change the projection direction of the projection apparatus 7 to move the projection image plane displayed on a projection surface (e.g., the projection surface described in the first exemplary embodiment) if the first user operation is detected by an operation detection unit 15 described below. The control unit 16 may change the projection contents (projection images) in the projection image plane without changing the projection direction if the second user operation is detected.

The operation detection unit 15 may specify the state of the projection image in the projection image plane in the detected user operation and may distinctively detect the first user operation and the second user operation based on the specified state of the projection image. In some instances, the operation detection unit 15 may specify the state of the projection image in the projection image plane based on the image information processed by the projection processing unit 11 when the user operation using the specific region for at least part of the projection image plane or outside of the projection image plane is detected. Specifying the state described above may include determination of whether the state of the projection image is a state that permits movement of the projection image plane.

In some instances, the operation detection unit 15 may specify, as the state, whether the projection image is in a state that accepts in-screen operation, whether the projection image is an initial image indicating the initial state, and the like. The operation detection unit 15 may detect the user operation as the first user operation if the projection image indicates a state that does not accept the in-screen operation and detect the user operation as the second user operation if the projection image indicates the state that accepts the in-screen operation. The operation detection unit 15 may detect the user operation as the first user operation if the projection image is the initial image and detect the user operation as the second user operation if the projection image is not the initial image. In some aspects, the relationship between the specified state of the projection image and the first and second user operations may not be limited.

[Example of Operation/Projection Control Method]

Hereinafter, the projection control method of the third exemplary embodiment will be described with reference to FIG. 10.

Figure 10:
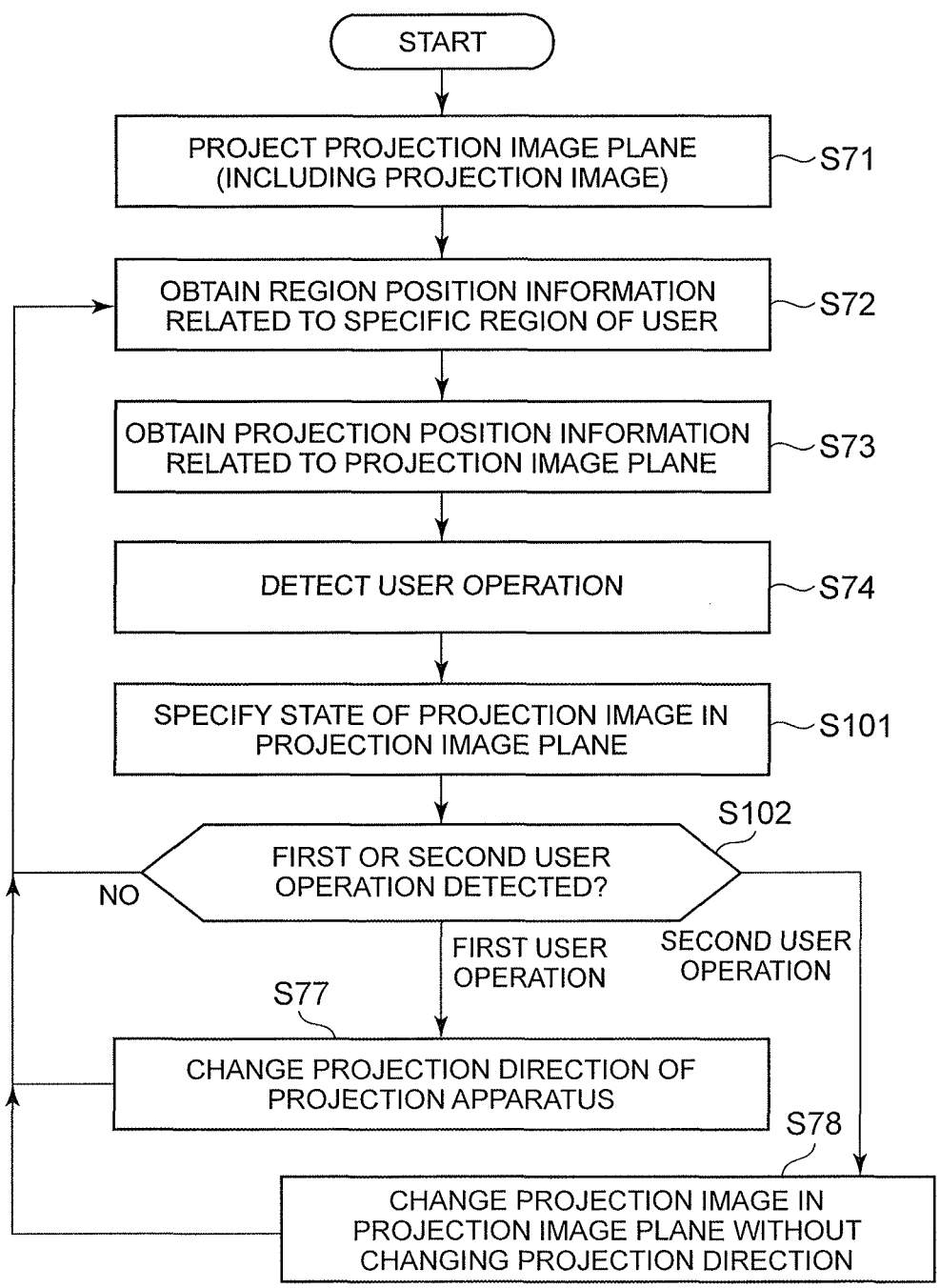
FIG. 10 is a flowchart depicting an example of operation of the projection control apparatus of a third exemplary embodiment.

FIG. 10 is a flowchart depicting an example of operation of the projection control apparatus 10 of the third exemplary embodiment. By way of example, the projection control apparatus 10 may be configured to perform the exemplary processes of FIG. 6 to cause the projection apparatus 7 to project the image (e.g., Step S71 of FIG. 6), to recognize the specific region of the user based on the sensor information obtained from the three-dimensional sensor 6 and obtain the region position information indicating the position of the recognized specific region (e.g., Step S72 of FIG. 6), to obtain the projection position information indicating the position where at least part of the projection image plane is projected, based on the sensor information obtained from the three-dimensional sensor 6 (e.g., Step S73 of FIG. 6), and to detect the user operation using the specific region for at least part of the projection image plane or outside of the projection image plane (e.g., Step S74 of FIG. 6).

In the Step S101, the projection control apparatus 10 may specify the state of the projection image in the projection image plane subjected to the user operation detected in the Step S74.

In the Step S102, the projection control apparatus 10 may determine whether the first or second user operation is detected based on the state of the projection image specified in the Step S101. The detection method of the first and second user operations based on the state of the projection image may be as described above.

In the Step S102, if the projection control apparatus 10 determines that the first user operation is detected (Step S102; first user operation), the projection control apparatus 10 may change the projection direction of the projection apparatus 7 in the Step S77. In some aspects, the projection control apparatus 10 may transmit the change instruction of the projection direction to the projection apparatus 7. In the Step S102, if the projection control apparatus 10 determines that the second user operation is detected (Step S102; second user operation), the projection control apparatus 10 may change the projection image in the projection image plane without changing the projection direction in the Step S78.

After the execution of Step S77 or Step S78 or if the projection control apparatus 10 determines that the first or second user operation is not detected (Step S102; NO), the projection control apparatus 10 may execute the process from Step S72 again.

Figure 11:
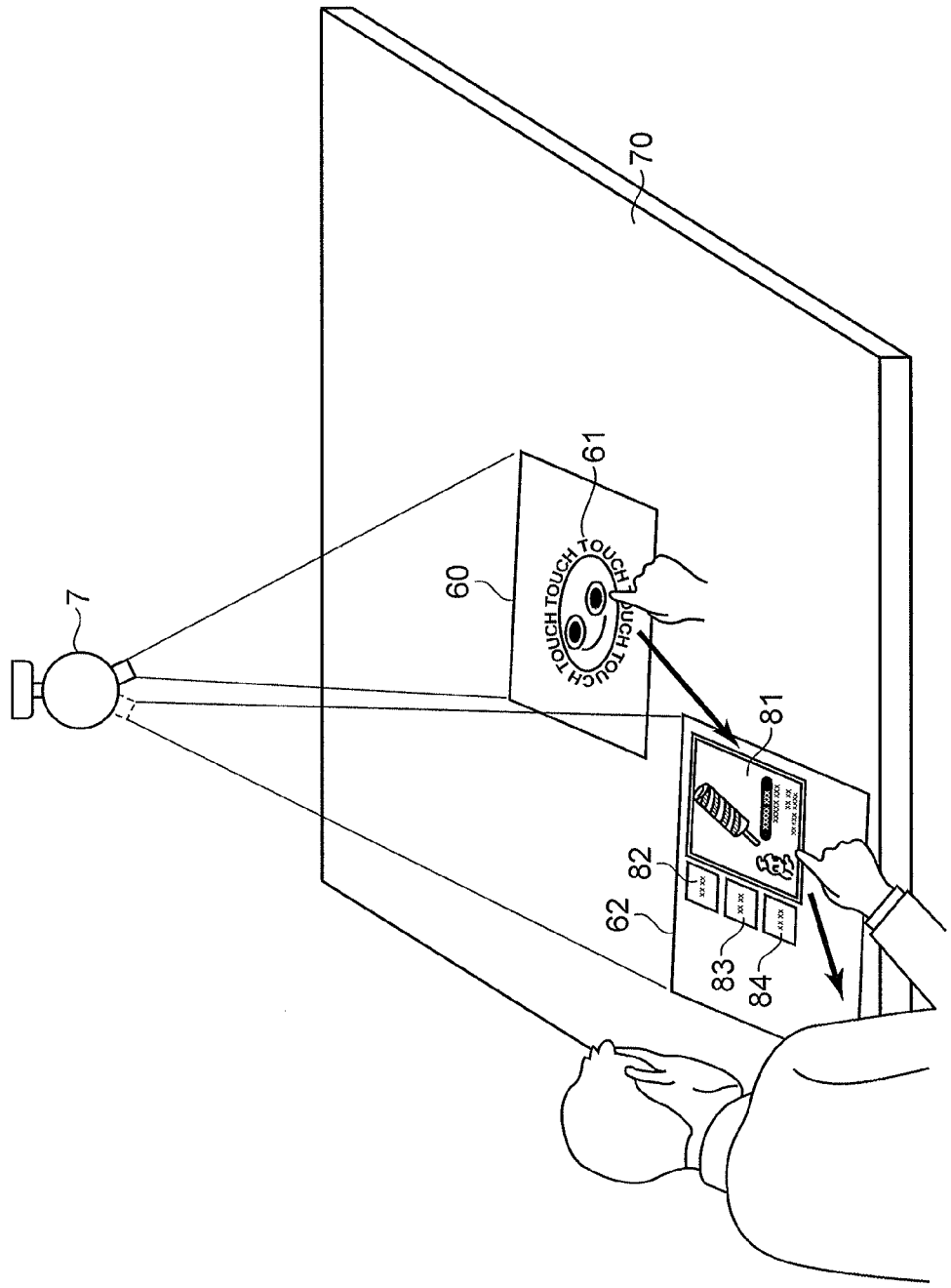
FIG. 11 is a diagram illustrating an example of movement of the projection image plane of the third exemplary embodiment.

FIG. 11 is a diagram illustrating an example of movement of the projection image plane of the third exemplary embodiment.

The projection control apparatus 10 may project a projection image plane 60 including a projection image 61 indicating the state that permits the movement of the projection image plane (described as initial state) at the center of the projection surface 70 (e.g., in Step S71 of FIG. 10). In some aspects, the projection control apparatus 10 may move the projection image plane 60 as if the projection image 61 in the initial state floats over the projection surface 70.

The projection control apparatus 10 may obtain the region position information indicating the position of the fingertip of the user using the table that serves as the projection surface 70 (e.g., in Step S72 of FIG. 10). The projection control apparatus 10 may obtain the projection position information indicating the position where the projection image plane 60 is projected (e.g., in Step S73 of FIG. 10). In some aspects, the projection control apparatus 10 may obtain the position of the projection image 61 in the projection image plane 60 as the projection position information.

The projection control apparatus 10 may detect operation in which the fingertip of the user touches the projection image plane 60 and in which the fingertip moves on the projection surface 70 (e.g., in Step S74 of FIG. 10). The projection control apparatus 10 may detect, as the start point of the user operation, the position where the fingertip of the user touches at least part of the projection image plane 60 or touches the projection surface 70 outside of the projection image plane 60.

The projection control apparatus 10 may recognize that the state of the projection image 61 in the projection image plane 60 subjected to the user operation detected in the Step S74 indicates the initial state (e.g., Steps S101, and S102; first user operation). The projection control apparatus 10 may change the projection direction of the projection apparatus 7 to move the projection image plane 60 to a position indicated by reference sign 62 (e.g., in Step S77 of FIG. 10). After the completion of the movement of the projection image plane 60, the projection control apparatus 10 may shift the state of the projection image 61 from the initial state to the state that allows accepting the in-screen operation. In the shift of the display state, the projection control apparatus 10 may cause the projection apparatus 7 to switch the projection image 61 to project the projection images 81, 82, 83, and 84 as illustrated in FIG. 11.

The projection images 81, 82, 83, and 84 for which the state is changed from the initial state to the state that allows accepting the in-screen operation may be processed as in the example of FIG. 8. In some instances, the projection control apparatus 10 may provide an operation button or the like for returning to the initial state in the projection images 81, 82, 83, and 84. The projection control apparatus 10 may switch the projection images 81, 82, 83, and 84 in accordance with the detection of the user operation for the operation button to restore the projection image 61 in the initial state.

As described, the user operation using the specific region for at least part of the projection image plane or outside of the projection image plane may be detected in the third exemplary embodiment, and whether the user operation is the first or second user operation may be determined based on the state of the projection image in the projection image plane in the detected user operation. The projection direction of the projection apparatus 7 or the projection image in the projection image plane may be changed in accordance with the determination result.

In some aspects, whether to move the projection image plane or to perform operation in the projection image plane may be switched in accordance with the state of the projection image in the projection image plane, and then the process of distinguishing the first and second user operations can be simplified, and the operation can be facilitated for the user.

Fourth Exemplary Embodiment

Hereinafter, a projection control apparatus and a projection control method of a fourth exemplary embodiment will be described with reference to the drawings. In the fourth exemplary embodiment, the movement of the projection image plane and the change in the projection image in the projection image plane may be switched based on the shape of the specific region of the user that serves as an operation body. Hereinafter, content of the fourth exemplary embodiment different from the first embodiment will be mainly described.

[Processing Configuration]

Figure 12:
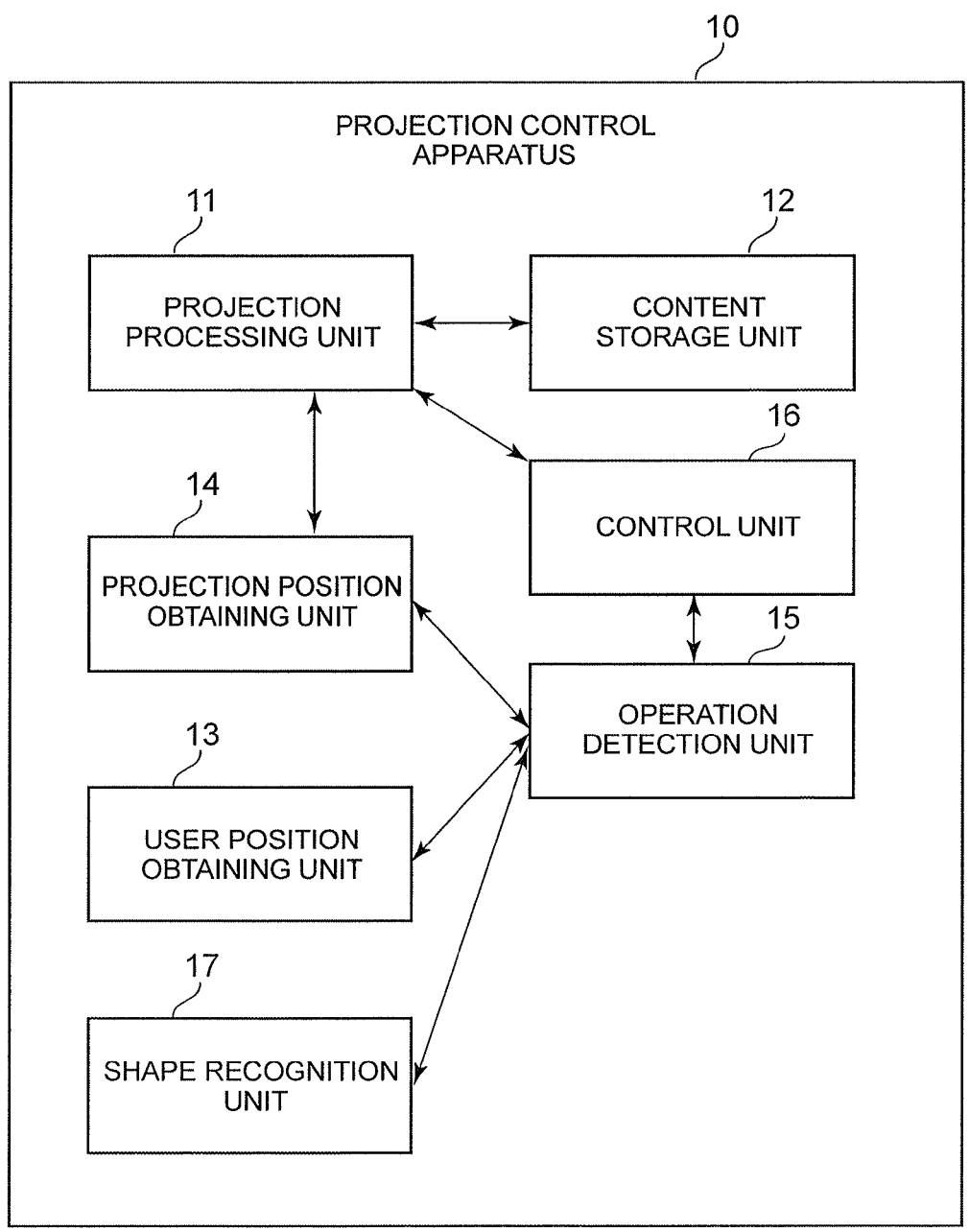
FIG. 12 is a diagram illustrating an example of a processing configuration of the projection control apparatus of a fourth exemplary embodiment.

FIG. 12 is a diagram illustrating an example of a processing configuration of the projection control apparatus 10 of the fourth exemplary embodiment. The projection control apparatus 10 of the fourth exemplary embodiment may include a shape recognition unit 17.

In an embodiment, the projection control apparatus 10 may include a projection processing unit 11, a content storage unit 12, a user position obtaining unit 13, a projection position obtaining unit 14, an operation detection unit 15, a control unit 16, and the like. In a certain aspects, the projection processing unit 11, the content storage unit 12, the user position obtaining unit 13, the projection position obtaining unit 14, and the control unit 16 are similar in functionality to corresponding elements of the projection control apparatus 10 described above in reference to FIG. 5.

For example, and as described above, the projection processing unit 11 may cause a projection apparatus 7 (e.g., the projection apparatus 7 described above in reference to FIG. 1) to project images.

The content storage unit 12 may store a plurality of pieces of image information for generating images to be projected on the projection apparatus 7.

The user position obtaining unit 13 may recognize a specific region of the user based on sensor information obtained from a three-dimensional sensor 6 (e.g., the three-dimensional sensor 6 described above in reference to FIG. 1) and may obtain region position information indicating the position of the recognized specific region.

The projection position obtaining unit 14 may obtain projection position information indicating the position where at least part of a projection image plane (e.g., the projection image plain described in the first exemplary embodiment) is projected, based on the sensor information obtained from the three-dimensional sensor 6.

The control unit 16 may change the projection direction of the projection apparatus 7 to move the projection image plane displayed on a projection surface (e.g., the projection surface described in the first exemplary embodiment) if the first user operation is detected by an operation detection unit 15 described below. The control unit 16 may change the projection contents (projection images) in the projection image plane without changing the projection direction if the second user operation is detected.

The shape recognition unit 17 may recognize the shape of the specific region of the user. The shape recognition unit 17 may recognize the shape of the specific region of the user recognized by the user position obtaining unit 13. The shape of the specific region may be recognized by a well-known image recognition process for the two-dimensional image included in the sensor information. In some instances, when a hand of the user is used as the specific region, various states may be recognized, such as a state that only one finger is raised up, a state that a plurality of fingers are raised up, a state that the hand is closed, and a state that the hand is opened. In some aspects, the shape recognition unit 17 may recognize the shape of the specific region of the user based on information obtained from another sensor, such as a strain sensor mounted on a data glove or a data suit. The recognition method of the shape of the specific region may not be limited.

The operation detection unit 15 may distinctively detect the first user operation and the second user operation based on the shape of the specific region at the detection of the user operation using the specific region for at least part of the projection image plane or outside of the projection image plane. In some instances, the operation detection unit 15 may determine that the user operation is the first user operation if the detected user operation is an operation using a plurality of fingers and determine that the user operation is the second user operation if the detected user operation is an operation using one finger. In other instances, the operation detection unit 15 may determine that the user operation is the first predetermined user operation if the detected user operation is an operation performed by both arms and determine that the user operation is the second predetermined user operation if the detected user operation is an operation performed by one arm. In other instances, the operation detection unit 15 may determine that the user operation is the first user operation if the detected user operation is an operation in a state that the palm of the hand is opened and determine that the user operation is the second user operation if the detected user operation is an operation in a state that the hand is closed.

In some aspects, the operation detection unit 15 may determine a user operation with few or small operating points as the second user operation and determine a user operation with many or large operating points as the first user operation. In this way, the user operation with few or small operating points may be allocated to the operation in the projection image plane, and the user operation with many or large operating points may be allocated to the operation of the projection image plane, thereby allowing the user to easily figure out the operation. In some aspects, the relationship between the shape of the specific region and the first and second user operations may not be limited.

[Example of Operation/Projection Control Method]

Hereinafter, the projection control method of the fourth exemplary embodiment will be described with reference to FIG. 13.

Figure 13:
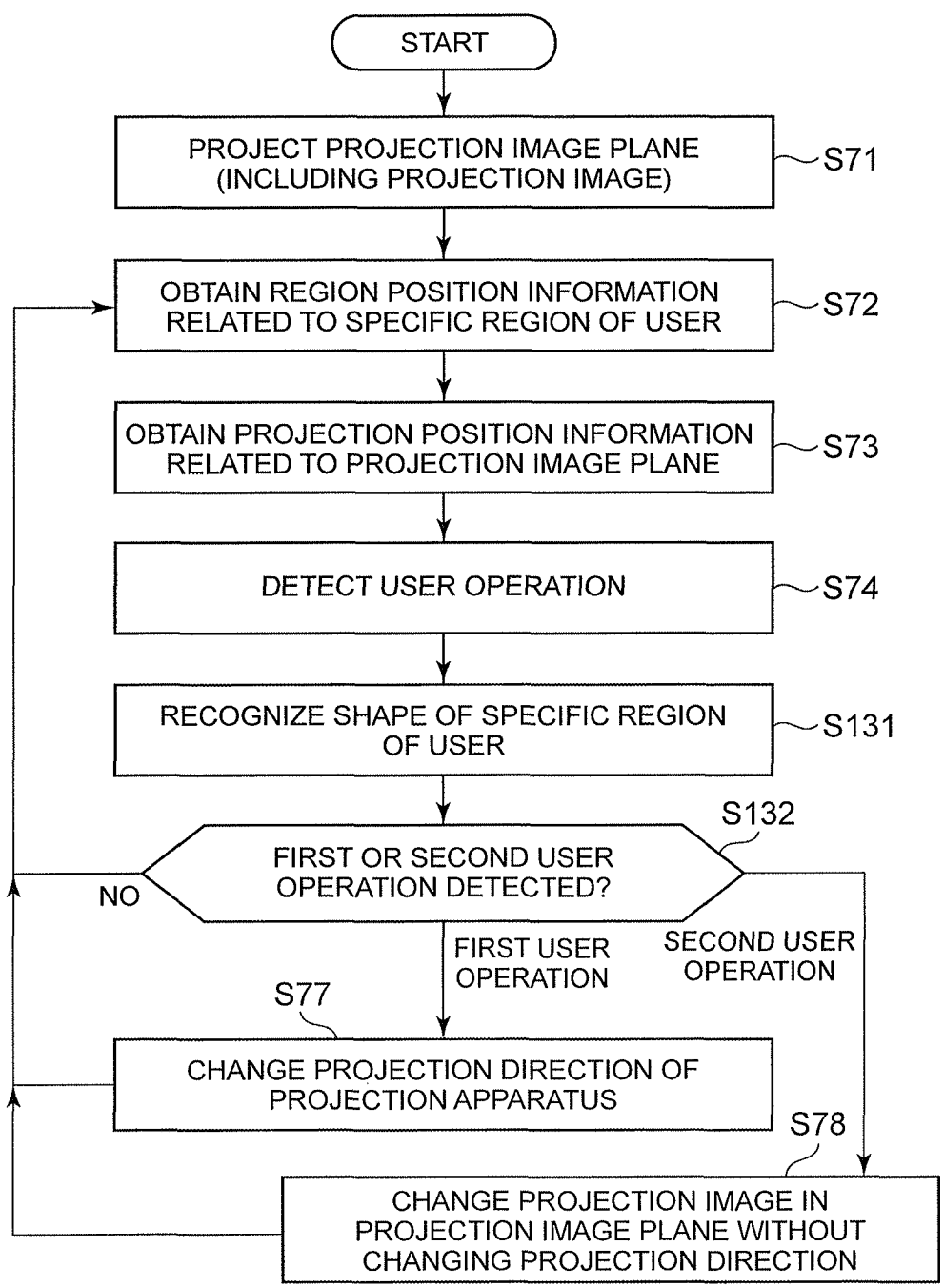
FIG. 13 is a flowchart depicting an example of operation of the projection control apparatus of the fourth exemplary embodiment.

FIG. 13 is a flowchart depicting an example of operation of the projection control apparatus 10 of the fourth exemplary embodiment.

Byway of example, the projection control apparatus 10 may be configured to perform the exemplary processes of FIG. 6 to cause the projection apparatus 7 to project the image (e.g., Step S71 of FIG. 6), to recognize the specific region of the user based on the sensor information obtained from the three-dimensional sensor 6 and obtain the region position information indicating the position of the recognized specific region (e.g., Step S72 of FIG. 6), to obtain the projection position information indicating the position where at least part of the projection image plane is projected, based on the sensor information obtained from the three-dimensional sensor 6 (e.g., Step S73 of FIG. 6), and to detect the user operation using the specific region for at least part of the projection image plane or outside of the projection image plane (e.g., Step S74 of FIG. 6).

When the user operation is detected in the Step S74, the projection control apparatus 10 may recognize the shape of the specific region of the user at this point (e.g., in the Step S131 of FIG. 13). The recognition method of the shape of the specific region may be as described above.

In the Step S132, the projection control apparatus 10 may determine whether the first or second user operation is detected based on the shape of the specific region of the user recognized in the Step S131. The detection method of the first and second user operations based on the shape of the specific region may be as described above.

In the Step S132, if the projection control apparatus 10 determines that the first user operation is detected (Step S32; first user operation), the projection control apparatus 10 may change the projection direction of the projection apparatus 7 in the Step S77. In some aspects, the projection control apparatus 10 may transmit the change instruction of the projection direction to the projection apparatus 7. In the Step S132, if the projection control apparatus 10 determines that the second user operation is detected (Step S132; second user operation), the projection control apparatus 10 may change the projection image in the projection image plane without changing the projection direction in the Step S78.

After the execution of Step S77 or Step S78 or if the projection control apparatus 10 determines that the first or second user operation is not detected (Step S132; NO), the projection control apparatus 10 may execute the process from Step S72 again.

As described, in the fourth exemplary embodiment, the user operation using the specific region for at least part of the projection image plane or outside of the projection image plane may be detected to recognize the shape of the specific region at the user operation, and whether the user operation is the first or second user operation may be determined based on the recognized shape of the specific region. The projection direction of the projection apparatus 7 or the projection image in the projection image plane may be changed according to the determination result.

According to the fourth exemplary embodiment, whether to move the projection image plane or to perform operation in the projection image plane may be switched in accordance with the shape of the specific region that serves as the operation body, allowing the user to easily perceive the operation. The user may perform desired operation just by changing the shape of the specific region used for the operation.

Modified Example of Fourth Exemplary Embodiment

In the fourth exemplary embodiment, the advantages may be obtained without recognizing the shape of the specific region of the user.

In a modified example, the projection control apparatus 10 may include a projection processing unit 11, a content storage unit 12, a user position obtaining unit 13, a projection position obtaining unit 14, an operation detection unit 15, a control unit 16, and the like. In a certain aspects, the projection processing unit 11, the content storage unit 12, the projection position obtaining unit 14, and the control unit 16 are similar in functionality to corresponding elements of the projection control apparatus 10 described above in reference to FIG. 5. In some aspects, the following processing content of the processing units may be different from the first exemplary embodiment.

The user position obtaining unit 13 may recognize a plurality of parts of a hand of the user as the specific regions and obtain the region position information indicating the positions of the plurality of recognized parts of the hand. In some instances, the user position obtaining unit 13 may recognize a plurality of fingers of the user as the specific regions and obtain the region position information indicating the positions of the fingers. In other instances, the user position obtaining unit 13 may recognize the palm of the hand along with the plurality of fingers as the specific regions and obtain the region position information indicating the positions of the fingers and the position of the palm of the hand. The position of the palm of the hand may be indicated by the position of one point at the center of the palm of the hand.

The operation detection unit 15 may specify the number of contacts of the parts for at least part of the projection image plane or outside of the projection image plane recognized by the user position obtaining unit 13 and distinctively detect the first user operation and the second user operation based on the specified number of contacts. In some instances, the operation detection unit 15 may specify the number of fingers of the user that have touched at least part of the projection image plane or outside of the projection image plane. In some aspects, the operation detection unit 15 may determine that the user operation is the first user operation if the number of contacts is greater than a predetermined number (for example, one) and determine that the user operation is the second user operation if the number of contacts is equal to or smaller than the predetermined number. In this way, the user operation with few operating points may be allocated to the operation in the projection image plane, and the user operation with many operating points may be allocated to the operation of the projection image plane, thereby allowing the user to easily figure out the operation. In some aspects, the relationship between the number of contacts and the first and second user operations may not be limited.

[Example of Operation/Projection Control Method]

Hereinafter, the projection control method of the modified example of the fourth exemplary embodiment will be described with reference to FIG. 14.

Figure 14:
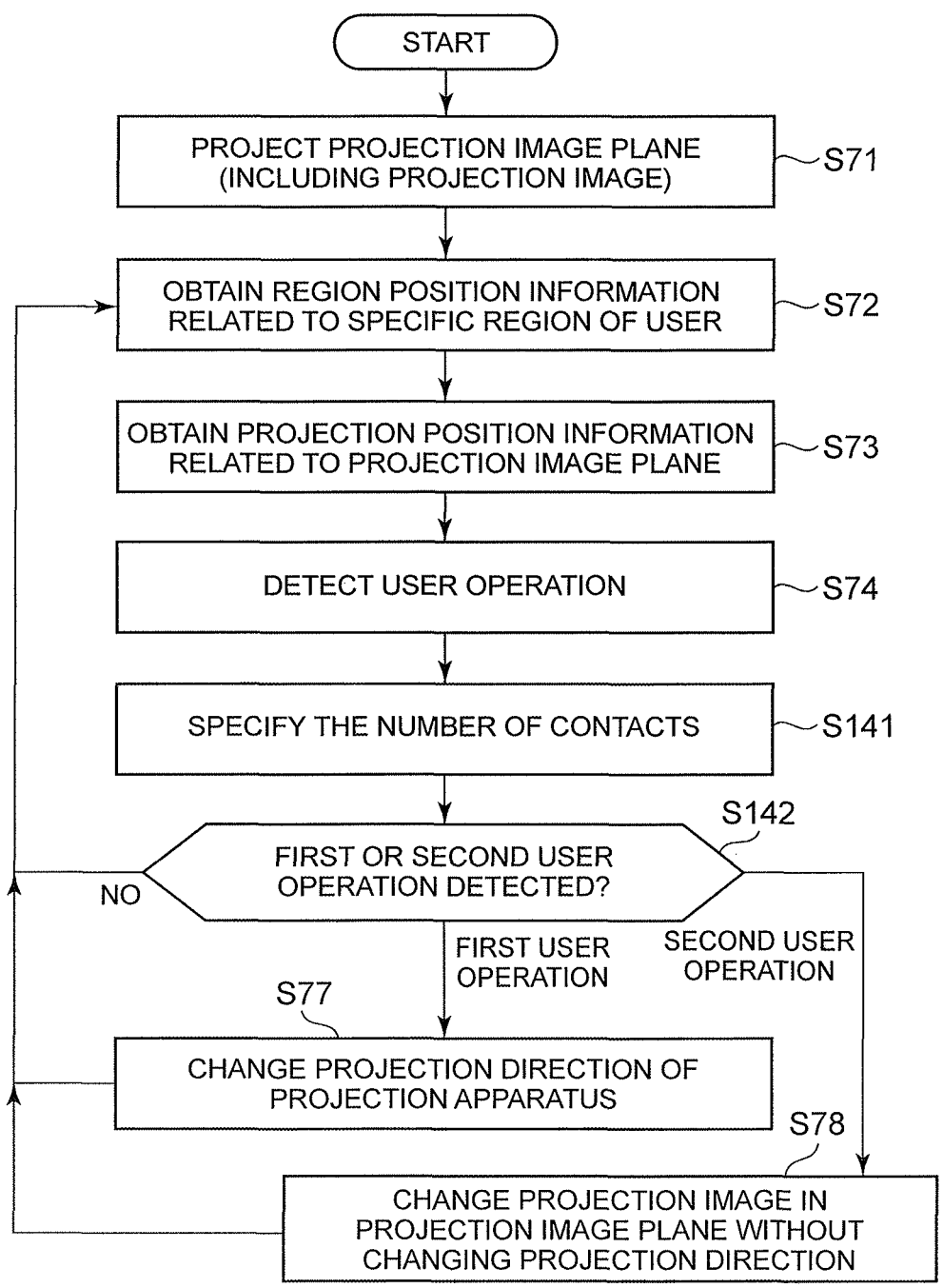
FIG. 14 is a flowchart depicting an example of operation of the projection control apparatus of a modified example of the fourth exemplary embodiment.

FIG. 14 is a flowchart depicting an example of operation of the projection control apparatus 10 of the modified example of the fourth exemplary embodiment.

By way of example, the projection control apparatus 10 may be configured to perform the exemplary processes of FIG. 6 to cause the projection apparatus 7 to project the image (e.g., Step S71 of FIG. 6), to recognize the specific region (e.g., the plurality of parts of the hand) of the user based on the sensor information obtained from the three-dimensional sensor 6 and obtain the region position information indicating the position of the parts of the hand (e.g., Step S72 of FIG. 6), to obtain the projection position information indicating the position where at least part of the projection image plane is projected, based on the sensor information obtained from the three-dimensional sensor 6 (e.g., Step S73 of FIG. 6), and to detect the user operation using the specific region for at least part of the projection image plane or outside of the projection image plane (e.g., Step S74 of FIG. 6).

In the Step S141, the projection control apparatus 10 may specify the number of contacts of the recognized parts of the hand in relation to the user operation detected in the Step S74.

In the Step S142, the projection control apparatus 10 may determine whether the first or second user operation is detected based on the number of contacts specified in the Step S141. The detection method of the first and second user operations based on the number of contacts may be as described above.

In some aspects, the shape of the specific region at the user operation may be determined by using the number of contacts of the specific regions. In some aspects, the user may perform desired operation just by changing the shape of the specific region used for the operation as in the fourth exemplary embodiment.

Fifth Exemplary Embodiment

Hereinafter, a projection control apparatus and a projection control method of a fifth embodiment will be described with reference to the drawings. In the fifth exemplary embodiment, the movement of the projection image plane and the change in the projection image in the projection image plane may be switched based on the movement speed of the specific region in the detected user operation. Hereinafter, content of the fifth exemplary embodiment different from the first embodiment will be mainly described.

[Processing Configuration]

In an embodiment, the projection control apparatus 10 may include a projection processing unit 11, a content storage unit 12, a user position obtaining unit 13, a projection position obtaining unit 14, an operation detection unit 15, a control unit 16, and the like. In a certain aspects, the projection processing unit 11, the content storage unit 12, the user position obtaining unit 13, the projection position obtaining unit 14, and the control unit 16 are similar in functionality to corresponding elements of the projection control apparatus 10 described above in reference to FIG. 5.

For example, and as described above, the projection processing unit 11 may cause a projection apparatus 7 (e.g., the projection apparatus 7 described above in reference to FIG. 1) to project images.

The content storage unit 12 may store a plurality of pieces of image information for generating images to be projected on the projection apparatus 7.

The user position obtaining unit 13 may recognize a specific region of the user based on sensor information obtained from a three-dimensional sensor 6 (e.g., the three-dimensional sensor 6 described above in reference to FIG. 1) and may obtain region position information indicating the position of the recognized specific region.

The projection position obtaining unit 14 may obtain projection position information indicating the position where at least part of a projection image plane (e.g., the projection image plain described in the first exemplary embodiment) is projected, based on the sensor information obtained from the three-dimensional sensor 6.

The control unit 16 may change the projection direction of the projection apparatus 7 to move the projection image plane displayed on a projection surface (e.g., the projection surface described in the first exemplary embodiment) if the first user operation is detected by an operation detection unit 15 described below. The control unit 16 may change the projection contents (projection images) in the projection image plane without changing the projection direction if the second user operation is detected.

The operation detection unit 15 may measure the movement speed of the specific region in the detected user operation based on the region position information obtained by the user position obtaining unit 13 and the projection position information obtained by the projection position obtaining unit 14 and distinctively detect the first user operation and the second user operation based on the measured movement speed. In some instances, when the user position obtaining unit 13 obtains the region position information at obtaining intervals of the sensor information from the three-dimensional sensor 6, the operation detection unit 15 may calculate the time spent for operation distance obtained from a plurality of pieces of region position information based on the obtaining intervals of the sensor information. The operation detection unit 15 may divide the operation distance by the time to measure the movement speed. The sensor information obtained from the three-dimensional sensor 6 may include time information, and the operation detection unit 15 may use the time information to measure the movement speed. The operation distance may be calculated by the distance from the position of the start of the user operation to the position of the end of the user operation.

The operation detection unit 15 may determine that the first user operation is detected if the movement speed is faster than a predetermined speed and determine that the second user operation is detected if the movement speed is slower than the predetermined speed. The opposite determination may be made.

[Example of Operation/Projection Control Method]

Hereinafter, the projection control method of the fifth exemplary embodiment will be described with reference to FIG. 15.

Figure 15:
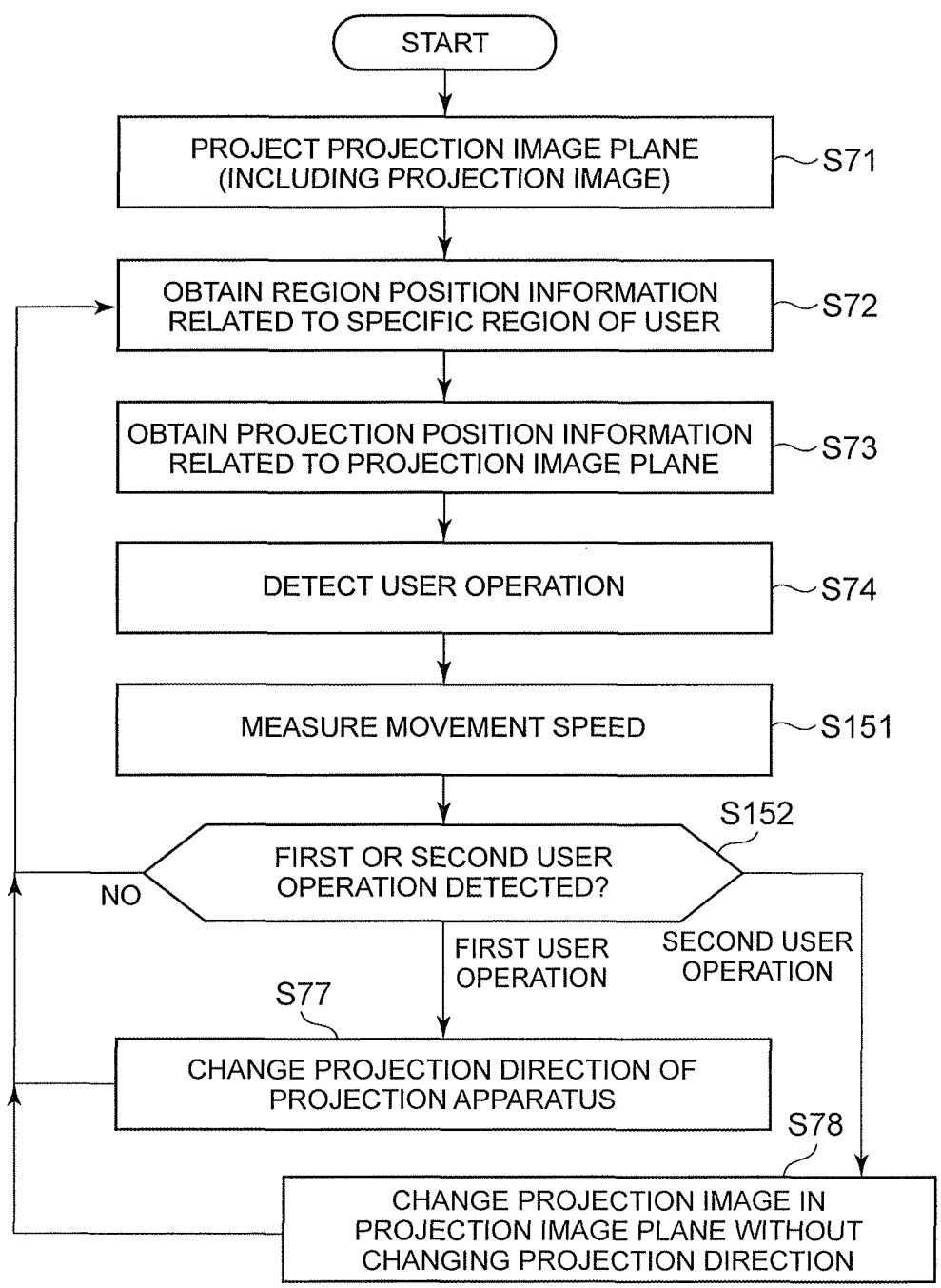
FIG. 15 is a flowchart depicting an example of operation of the projection control apparatus of a fifth exemplary embodiment.

FIG. 15 is a flowchart depicting an example of operation of the projection control apparatus 10 of the fifth embodiment.

By way of example, the projection control apparatus 10 may be configured to perform the exemplary processes of FIG. 6 to cause the projection apparatus 7 to project the image (e.g., Step S71 of FIG. 6), to recognize the specific region of the user based on the sensor information obtained from the three-dimensional sensor 6 and obtain the region position information indicating the position of the recognized specific region (e.g., Step S72 of FIG. 6), to obtain the projection position information indicating the position where at least part of the projection image plane is projected, based on the sensor information obtained from the three-dimensional sensor 6 (e.g., Step S73 of FIG. 6), and to detect the user operation using the specific region for at least part of the projection image plane or outside of the projection image plane (e.g., Step S74 of FIG. 6).

In the Step S151, the projection control apparatus 10 may measure the movement speed of the specific region subjected to the user operation detected in the Step S74. The measurement method of the movement speed may be as described above.

In the Step S152, the projection control apparatus 10 may determine whether the first or second user operation is detected based on the movement speed of the specific region measured in the Step S151. The detection method of the first and second user operations based on the movement speed may be as described above.

In the Step S152, if the projection control apparatus 10 determines that the first user operation is detected (Step S152; first user operation), the projection control apparatus 10 may change the projection direction of the projection apparatus 7 in the Step S77. In some aspects, the projection control apparatus 10 may transmit the change instruction of the projection direction to the projection apparatus 7. In the Step S152, if the projection control apparatus 10 determines that the second user operation is detected (Step S152; second user operation), the projection control apparatus 10 may change the projection image in the projection image plane without changing the projection direction in the Step S78.

After the execution of Step S77 or Step S78 or if the projection control apparatus 10 determines that the first or second user operation is not detected (Step S152; NO), the projection control apparatus 10 may execute the process from Step S72 again.

As described, in the fifth exemplary embodiment, the user operation using the specific region for at least part of the projection image plane or outside of the projection image plane may be detected to measure the movement speed of the specific region subjected to the user operation, and whether the user operation is the first or second user operation may be determined based on the measured movement speed. The projection direction of the projection apparatus 7 or the projection image in the projection image plane may be changed according to the determination result.

According to the fifth exemplary embodiment, an operation parameter that is the movement speed of the moving body may be used to switch whether to move the projection image plane or to perform operation in the projection image plane.

Sixth Exemplary Embodiment

Hereinafter, a projection control apparatus and a projection control method of a sixth exemplary embodiment will be described with reference to FIGS. 16 and 17.

[Processing Configuration]

Figure 16:
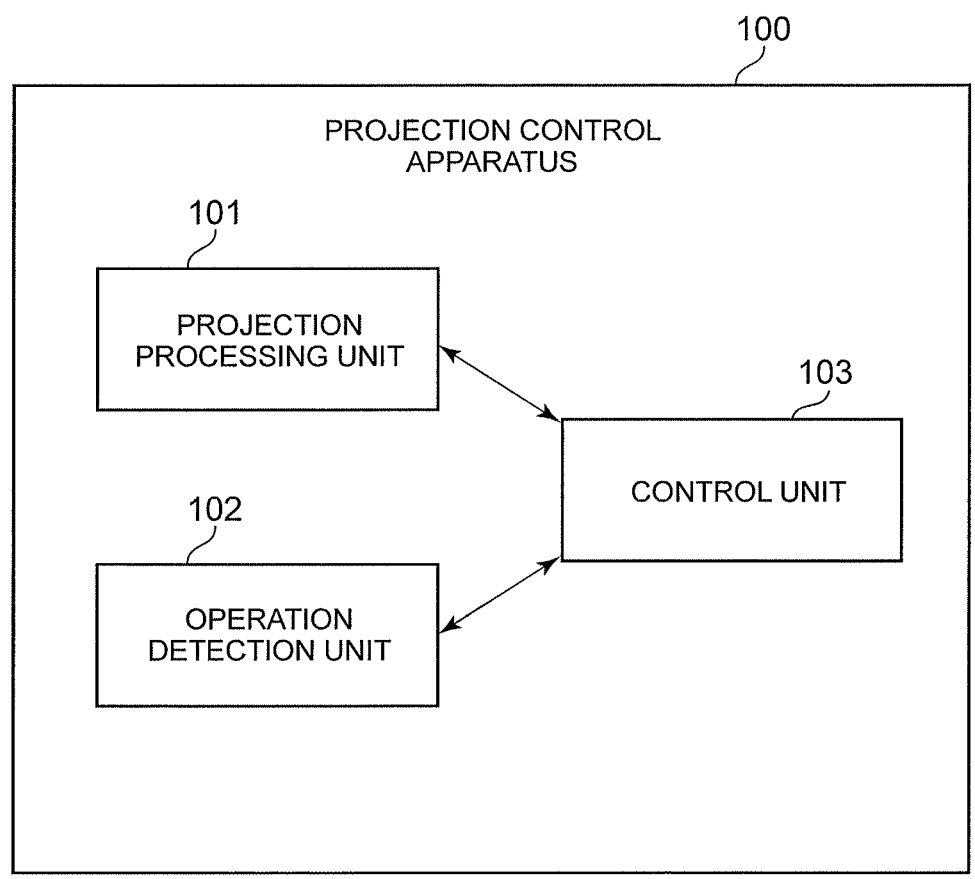
FIG. 16 is a diagram illustrating an example of a processing configuration of the projection control apparatus of a sixth exemplary embodiment.

FIG. 16 is a diagram illustrating an example of a processing configuration of the projection control apparatus of the sixth exemplary embodiment. As illustrated in FIG. 16, a projection control apparatus 100 may include a projection processing unit 101, an operation detection unit 102, and a control unit 103. The projection control apparatus 100 may be a projection-type digital signage apparatus including a CPU (Central Processing Unit) 2, a memory 3, a communication unit 4, and the like. The memory 3 may be a RAM (Random Access Memory), a ROM (Read Only Memory), a hard disk, or the like. In certain aspects, the CPU 2, the memory 3, and the communication terminal 4 of FIG. 1 are similar in functionality to corresponding elements of the projection control apparatus 10 described above in reference to FIG. 1.

The processing units included in the projection control apparatus 100 may be realized by processing of programs as in the projection control apparatus 10.

The projection processing unit 101 may cause the projection apparatus, which can change projection parameters for setting a projection method of an image, to project the image. Specific processing content of the projection processing unit 101 may include the processing content of the projection processing unit 11. The projection apparatus may correspond to the projection apparatus 7 illustrated in FIG. 1. The projection apparatus of the sixth exemplary embodiment is a projection apparatus that can change projection parameters including the projection direction.

The projection parameters may be settings that affect the entire projection image plane projected by the projection apparatus and that can be changed by the projection apparatus or other devices, and the projection parameters may be different from the image information related to the projection image displayed in the projection image plane. The projection parameters may include the projection direction, may include one of the parameters other than the projection direction, or may include a combination of these. In some instances, the direction adjustment unit 8 included in the projection apparatus 7 may realize the change in the projection direction. The projection parameters other than the projection direction may include zoom magnification, image quality (such as brightness and contrast), and the like. In some instances, the zoom magnification may be changed to enlarge or reduce the size of the projection image plane projected on the projection surface. In some aspects, changing the size of the projection image plane may similarly change the size of the projection image in the projection image plane accordingly.

The operation detection unit 102 may detect the user operation. Specific processing content of the operation detection unit 102 may include the processing content of the operation detection unit 15.

The control unit 103 may control the projection apparatus to change the projection parameters to project the image if the first user operation is detected and controls the projection processing unit 101 to change the image (projection image) without changing the projection parameters if the second user operation is detected. Specific processing content of the control unit 103 may include the processing content of the control unit 16. The control unit 103 may change the projection parameters or may cause the projection apparatus to change the projection parameters.

The control unit 103 may control the projection apparatus to change the projection parameters other than the projection direction to project the image if the first user operation is detected and control the projection processing unit 101 to change the projection image without changing the projection parameters if the second user operation is detected. In some instances, the control unit 16 may increase the zoom magnification to enlarge the size of the projection image plane projected on the projection surface if the first user operation is detected and enlarge the size of the target projection image in the projection image plane if the second user operation is detected. When the size of the projection image plane is enlarged, the size of the projection image in the projection image plane may be enlarged accordingly. In some aspects, the change in the size of the projection image in the projection image plane may not directly be linked to the change in the size of the projection image plane. The change in the size of the target projection image plane in the projection image plane may be realized by changing the image information transmitted from the projection processing unit 11 to the projection apparatus 7. In some instances, user operation using both arms as the specific regions may be assigned to the first user operation for changing the size of the projection image plane.

The projection control apparatus 100 may include the content holding unit 12, or another computer may include these.

[Example of Operation/Projection Control Method]

FIG. 17 is a flowchart depicting an example of operation of the projection control apparatus 100 of the sixth exemplary embodiment. At least one computer, such as the projection control apparatus 100, may execute the projection control method of the sixth exemplary embodiment. In some aspects, the processing units included in the projection control apparatus 100 may execute the depicted steps.

The projection control method according to the sixth exemplary embodiment may include Steps S171 to S175 as depicted in FIG. 17.

In the Step S171, the projection control apparatus 100 may cause the projection apparatus, which can change the projection parameters for setting the projection method of an image, to project the image.

In the Step S172, the projection control apparatus 100 may detect the user operation.

Step S171 and Step S172 may correspond to Step S71 and Step S74 of the drawings described above.

If the first user operation is detected (e.g., in the Step S173; first user operation), the projection control apparatus 100 may cause the projection apparatus to change the projection parameters to project the image (e.g., in the Step S174). If the second user operation is detected (e.g., in the Step S173; second user operation), the projection control apparatus 100 may change the projection image in the projection image plane without changing the projection parameters (e.g., in the Step S175). Step S173 may correspond to Steps S76, S92, S102, S132, S142, and S152 described above. Step S174 and Step S175 may correspond to Step S77 and Step S78 of the drawings described above. In some aspects, Step S174 may include the change in the projection parameters other than the projection direction as described above.

The sixth exemplary embodiment may be a program causing at least one computer to execute the projection control method or may be a recording medium readable by the at least one computer, the medium recording the program.

In addition to the same effects and advantages as in the embodiments and the modified examples, the sixth exemplary embodiment can move, enlarge, or reduce the projection image plane or change the image quality along with the change in the projection parameters other than the projection direction.

The projection control apparatus 10 and the projection control apparatus 100 may be connected to a plurality of projection apparatuses 7. In some aspects, the projection control apparatus 10 and the projection control apparatus 100 can separately project and control a plurality of projection image planes to allow handling individual user operations of a plurality of users. In some aspects, the projection control apparatus 10 and the projection control apparatus 100 can increase the number of operating projection apparatuses 7 according to the number of participating users. In some instances, after a user operates the projection image plane projected by a projection apparatus 7, the projection control apparatus 10 and the projection control apparatus 100 may cause another projection apparatus 7 to start projecting the projection image plane.

The projection control apparatus 10 and the projection control apparatus 100 can also recognize specific regions (for example, arms) of a plurality of users to detect collaborative operation by a plurality of users and distinctively detect the first user operation and the second user operation based on the collaborative operation.

Although the plurality of steps (processes) are sequentially described in the plurality of flow charts used in the description, the execution order of the steps executed in the embodiments and the modified examples is not limited to the described order. In the embodiments and the modified examples, the order of the illustrated steps can be changed without disrupting the content. For example, Step S72 and Step S73 may be executed in the opposite order in FIG. 6 or may be executed in parallel.

The embodiments and the modified examples can be combined without contradicting the content. Although the operation time, the display state of the projection image plane, the shape of the specific region, the number of contacts of the specific region, and the movement speed of the specific region are used in the second to fifth exemplary embodiments in place of the position of the user operation used in the first exemplary embodiment, these pieces of information may be used in addition to the position of the user operation. A combination of any of these pieces of information may also be used.

Part or all of the embodiments and the modified examples can be specified as below. The embodiments and the modified examples are not limited to the description below.

(Supplementary Note 1)

A projection control apparatus including:

a projection processing unit that causes a projection apparatus, which can change projection parameters for setting a projection method of an image, to project the image;

an operation detection unit that detects a user operation; and a control unit that controls the projection apparatus to change the projection parameters to project the image if a first user operation is detected and controls the projection processing unit to change the image without changing the projection parameters if a second user operation is detected.

(Supplementary Note 2)

The projection control apparatus according to supplementary note 1, further including:

a user position obtaining unit that recognizes a specific region of a user based on sensor information obtained from a three-dimensional sensor to obtain region position information indicating a position of the recognized specific region; and a projection position obtaining unit that obtains projection position information indicating a position where at least part of a projection image plane projected by the projection apparatus is projected, based on the sensor information obtained from the three-dimensional sensor, wherein the operation detection unit detects a user operation using the specific region for at least part of the projection image plane or outside of the projection image plane based on the region position information and the projection position information.

(Supplementary Note 3)

The projection control apparatus according to supplementary note 2, wherein the operation detection unit specifies a position of the detected user operation to distinguish and detect the first user operation and the second user operation based on the specified operation position.

(Supplementary Note 4)

The projection control apparatus according to supplementary note 2 or 3, wherein the operation detection unit measures operation time of the detected user operation to distinguish and detect the first user operation and the second user operation based on the measured operation time.

(Supplementary Note 5)

The projection control apparatus according to any one of supplementary note 2 to 4, wherein the operation detection unit specifies a state of a projection image in the projection image plane in the detected user operation to distinguish and detect the first user operation and the second user operation based on the specified state of the projection image.

(Supplementary Note 6)

The projection control apparatus according to any one of supplementary note 2 to 5, further including a shape recognition unit that recognizes a shape of the specific region of the user, wherein the first user operation and the second user operation are distinguished and detected based on the shape of the specific region at the detection of the user operation.

(Supplementary Note 7)

The projection control apparatus according to any one of supplementary note 2 to 5, wherein the user position obtaining unit recognizes a plurality of parts of a hand of the user as the specific region to obtain region position information indicating the positions of the plurality of recognized parts of the hand, and the operation detection unit specifies the number of contacts of the recognized parts of the hand for at least part of the projection image plane or outside of the projection image plane to distinguish and detect the first user operation and the second user operation based on the specified number of contacts.

(Supplementary Note 8)

The projection control apparatus according to any one of supplementary note 2 to 7, wherein the operation detection unit measures movement speed of the specific region in the detected user operation based on the region position information and the projection position information to distinguish and detect the first user operation and the second user operation based on the measured movement speed.

(Supplementary Note 9)

A projection control method executed by at least one computer, the projection control method including:

causing a projection apparatus, which can change projection parameters for setting a projection method of an image, to project the image;

detecting a user operation; and causing the projection apparatus to change the projection parameters to project the image if a first user operation is detected and to change the image without changing the projection parameters if a second user operation is detected.

(Supplementary Note 10)

The projection control method according to supplementary note 9, further including:

recognizing a specific region of a user based on sensor information obtained from a three-dimensional sensor to obtain region position information indicating a position of the recognized specific region; and obtaining projection position information indicating a position where at least part of a projection image plane projected by the projection apparatus is projected, based on the sensor information obtained from the three-dimensional sensor, wherein in the detecting the user operation, a user operation using the specific region for at least part of the projection image plane or outside of the projection image plane is detected based on the region position information and the projection position information.

(Supplementary Note 11)

The projection control method according to supplementary note 10, further including specifying a position of the detected user operation, wherein in the detecting the user operation, the first user operation and the second user operation are distinguished and detected based on the specified operation position.

(Supplementary Note 12)

The projection control method according to supplementary note 10 or 11, further including measuring operation time of the detected user operation, wherein in the detecting the user operation, the first user operation and the second user operation are distinguished and detected based on the measured operation time.

(Supplementary Note 13)

The projection control method according to any one of supplementary note 10 to 12, further including specifying a state of a projection image in the projection image plane in the detected user operation, wherein in the detecting the user operation, the first user operation and the second user operation are distinguished and detected based on the specified state of the projection image.

(Supplementary Note 14)

The projection control method according to any one of supplementary note 10 to 13, further including recognizing a shape of the specific region of the user, wherein in the detecting the user operation, the first user operation and the second user operation are distinguished and detected based on the shape of the specific region at the detection of the user operation.

(Supplementary Note 15)

The projection control method according to any one of supplementary note 10 to 13, wherein the specific region is a plurality of parts of a hand of the user, the projection control method further includes specifying the number of contacts of the recognized parts of the hand for at least part of the projection image plane or outside of the projection image plane, and in the detecting the user operation, the first user operation and the second user operation are distinguished and detected based on the specified number of contacts.

(Supplementary Note 16)

The projection control method according to any one of supplementary note 10 to 15, further including measuring movement speed of the specific region in the detected user operation based on the region position information and the projection position information, wherein in the detecting the user operation, the first user operation and the second user operation are distinguished and detected based on the measured movement speed.

(Supplementary Note 17)

A program causing at least one computer to execute the projection control method according to any one of supplementary note 9 to 16.

What is claimed is:

1. A projection control apparatus comprising:
a memory storing instructions; and
at least one processor configured to process the instructions to:
cause a projection apparatus to project an image;
detect at least one of a first user operation and a second user operation;
control the projection apparatus to change projection parameters upon detecting the first user operation;
change the image without changing the projection parameters upon detecting the second user operation;
recognize a specific region of a user based on information obtained from a sensor to obtain region position information indicating a position of the recognized specific region;
obtain projection position information indicating a position where at least part of a projection image plane is projected, based on the obtained sensor information; and detect at least one of the first user operation and the second user operation based on the region position information and the projection position information.

2. The projection control apparatus according to claim 1, wherein the at least one processor is configured to process the instructions to specify a position of the detected user operation to distinctively detect the first user operation and the second user operation.

3. The projection control apparatus according to claim 1, wherein the at least one processor is configured to process the instructions to measure an operation time to distinctively detect the first user operation and the second user operation.

4. The projection control apparatus according to claim 1, wherein the at least one processor is configured to process the instructions to specify a state of a projection image in the projection image plane to distinctively detect the first user operation and the second user operation.

5. The projection control apparatus according to claim 1, wherein the at least one processor is configured to process the instructions to:
recognize a shape of the specific region of the user; and
distinctively detect the first user operation and the second user operation based on the shape of the specific region.

6. The projection control apparatus according to claim 1, wherein the at least one processor is configured to process the instructions to:
recognize a plurality of parts of a hand of the user as the specific region to obtain region position information indicating the positions of the plurality of recognized parts of the hand; and
specify a number of contacts of the recognized parts of the hand for at least part of the projection image plane or outside of the projection image plane to distinctively detect the first user operation and the second user operation.

7. The projection control apparatus according to claim 1, wherein the at least one processor is configured to process the instructions to measure movement speed of the specific region to distinctively detect the first user operation and the second user operation.

8. The projection control apparatus according to claim 1, comprising a projector that adjusts a position of the first image by changing at least one of direction and position of projected light.

9. The projection control apparatus according to claim 8, wherein the projector adjusts the position of the image in accordance with the detected user operation.

10. A projection control method comprising:
projecting an image;
detecting at least one of a first user operation and a second user operation;
changing projection parameters of the image upon detecting the first user operation;
changing the image without changing the projection parameters upon detecting the second user operation;
recognizing a specific region of a user based on information obtained from a sensor to obtain region position information indicating a position of the recognized specific region;
obtaining projection position information indicating a position where at least part of a projection image plane is projected, based on the obtained sensor information; and
detecting at least one of the first user operation and the second user operation based on the region position information and the projection position information.

11. The projection control method according to claim 10, further comprising specifying a position of the detected user operation to distinctively detect the first user operation and the second user operation.

12. The projection control method according to claim 10, further comprising measuring an operation time to distinctively detect the first user operation and the second user operation.

13. The projection control method according to claim 10, further comprising specifying a state of a projection image in the projection image plane to distinctively detect the first user operation and the second user operation.

14. The projection control method according to claim 10, further comprising:
recognizing a shape of the specific region of the user; and
distinctively detecting the first user operation and the second user operation based on the shape of the specific region.

15. The projection control method according to claim 10, further comprising:
recognizing a plurality of parts of a hand of the user as the specific region to obtain region position information indicating the positions of the plurality of recognized parts of the hand; and
specifying a number of contacts of the recognized parts of the hand for at least part of the projection image plane or outside of the projection image plane to distinctively detect the first user operation and the second user operation.

16. The projection control method according to claim 10, further comprising measuring movement speed of the specific region based on the region position information and the projection position information to distinctively detect the first user operation and the second user operation.

17. A non-transitory computer-readable storage medium storing instructions that when executed by a computer enable the computer to implement a method comprising:
projecting an image;
detecting at least one of a first user operation and a second user operation;
changing projection parameters of the image upon detecting the first user operation;
changing the image without changing the projection parameters upon detecting the second user operation;
recognizing a specific region of a user based on information obtained from a sensor to obtain region position information indicating a position of the recognized specific region;
obtaining projection position information indicating a position where at least part of a projection image plane is projected, based on the obtained sensor information; and
detecting at least one of the first user operation and the second user operation based on the region position information and the projection position information.

* * * * *